(12) United States Patent
Walsh et al.

(10) Patent No.: US 12,321,773 B1
(45) Date of Patent: Jun. 3, 2025

(54) SYSTEM AND METHOD FOR A SAFETY CRITICAL OPERATING ENVIRONMENT CONTAINER ARCHITECTURE

(71) Applicant: Parry Labs, LLC, Alexandria, VA (US)

(72) Inventors: David Walsh, Alexandria, VA (US); Charles Adams, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/395,210

(22) Filed: Dec. 22, 2023

(51) Int. Cl.
*G06F 9/455* (2018.01)
*G06N 20/00* (2019.01)

(52) U.S. Cl.
CPC ......... *G06F 9/45558* (2013.01); *G06N 20/00* (2019.01); *G06F 2009/45562* (2013.01); *G06F 2009/45579* (2013.01); *G06F 2009/45583* (2013.01)

(58) Field of Classification Search
CPC ....... G06F 9/45558; G06F 2009/45562; G06F 2009/45579; G06F 2009/45583
See application file for complete search history.

(56) References Cited

U.S. PATENT DOCUMENTS 11,016,793 B2   5/2021  Tsirkin
11,120,299 B2 * 9/2021  Haigh .................... G06N 3/063
11,789,764 B2  10/2023  Vidyadhara et al.
(Continued)

FOREIGN PATENT DOCUMENTS

WO   2016102055 A2   6/2016
WO   2021079206 A1   4/2021

OTHER PUBLICATIONS

Lozano et al; A Comprehensive Survey on the Use of Hypervisors in Safety-Critical Systems; Received Mar. 9, 2023, accepted Mar. 29, 2023, date of publication Apr. 5, 2023, date of current version Apr. 14, 2023. Digital Object Identifier 10.1109/ACCESS.2023. 3264825.

(Continued)

*Primary Examiner* — Jacob D Dascomb
(74) *Attorney, Agent, or Firm* — Caldwell Intellectual Property Law

(57) ABSTRACT

A system for providing a safety critical operating environment container architecture, the system including a computing device having a memory communicatively connected to at least one multi-core processor, the memory containing instructions configuring the processer to receive at least a software module to be executed on the at least one multi-core processor, create a separate virtual environment for the at least a software module, wherein creating the virtual environment further includes generating a virtualization layer and allocating a dedicated private static memory space through the virtualization layer, wherein the separate virtual environment includes a dedicated operating system, integrate the at least a software module into the virtual environment by instantiating, the software module into at least one software container, wherein the at least one software container includes a plurality of dedicated software packages and execute the software module on each software container for each virtual environment.

18 Claims, 9 Drawing Sheets

(56) References Cited

U.S. PATENT DOCUMENTS

| | | | |
|---|---|---|---|
| 2011/0138147 A1* | 6/2011 | Knowles | G06F 9/5016 |
| | | | 711/170 |
| 2012/0022671 A1 | 1/2012 | Sachs et al. | |
| 2016/0314057 A1* | 10/2016 | De Oliveira | G06F 11/3612 |
| 2021/0026680 A1 | 1/2021 | Toy | |
| 2022/0027186 A1* | 1/2022 | Preimesberger | G06F 3/1454 |
| 2023/0092214 A1 | 3/2023 | Wu et al. | |
| 2023/0409367 A1* | 12/2023 | Tsirkin | G06F 9/45558 |

OTHER PUBLICATIONS

Zhang et al; Virtualization Airborne Trusted General Computing Technology; Appl. Sci. 2023, 13(3) Published: Jan. 19, 2023.
International Search Report; PCT/US2024/061661; Date: Feb. 18, 2025; By: Authorized Officer Taina Matos.

* cited by examiner

SYSTEM AND METHOD FOR A SAFETY CRITICAL OPERATING ENVIRONMENT CONTAINER ARCHITECTURE

FIELD OF THE INVENTION

The present invention generally relates to the field of virtualization technology. In particular, the present invention is directed a system for safety critical operating environment container architectures.

BACKGROUND

Systems and software relating to aviation or military technology are not uniform across all operating system platforms and therefore implementation of multiple systems on a single platform may be difficult. In addition, current hardware and computing environment configurations lack proper security and reliability, particularly when executing multiple applications and third-party applications.

SUMMARY OF THE DISCLOSURE

In an aspect a system for providing a Safety Critical Operating Environment Container Architecture (SCOE) is described. The system includes a computing device, the computing device having at least one multi-core processor and a memory communicatively connected to the at least one multi-core processor. The memory containing instructions configuring the at least one multi-core processor to receive at least a software module to be executed on the at least one multi-core processor, create a separate virtual environment for the at least a software module, wherein creating the virtual environment further includes generating a virtualization layer and allocating a dedicated private static memory space through the virtualization layer, wherein the separate virtual environment includes a dedicated operating system. The memory further contains instructions to integrate the at least a software module into the virtual environment by instantiating, the software module into at least one software container, wherein the at least one software container includes a plurality of dedicated software packages and execute the software module on each software container for each virtual environment.

In another aspect a method for providing a safety critical operating environment container architecture is described. The method includes receiving a computing device, the computing device having at least one multi-core processor and a memory communicatively connected to the at least one multi-core processor. The method further includes receiving, by the computing device, at least a software module to be executed on the at least one multi-core processor, creating, by the computing device, a separate virtual environment for the at least a software module, wherein creating the virtual environment further includes generating a virtualization layer and allocating a dedicated private static memory space through the virtualization layer, wherein the separate virtual environment comprises a dedicated operating system. The method further includes integrating, by the computing device, the at least a software module into the virtual environment by instantiating, the software module into at least one software container, wherein the at least one software container comprises a plurality of dedicated software packages and executing, by the computing device, the software module on each software container for each virtual environment.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for providing a safety critical operating environment container architecture. In an embodiments, system includes a computing device having a multicore-processor, virtual environment and a software container. In one or more embodiments, system may include a hypervisor, one or more virtual machines, and one or more virtual environments.

Aspects of the present disclosure can be used to allow for execution of safety critical software. Aspects of the present disclosure can also be used to allow for isolation of one or more software on a single computing device. This is so, at least in part because of the use of a hypervisor and one or more dedicated memory spaces. Exemplary embodiments illustrating aspects of the present disclosure are described below in the context of several specific examples.

Figure 1:
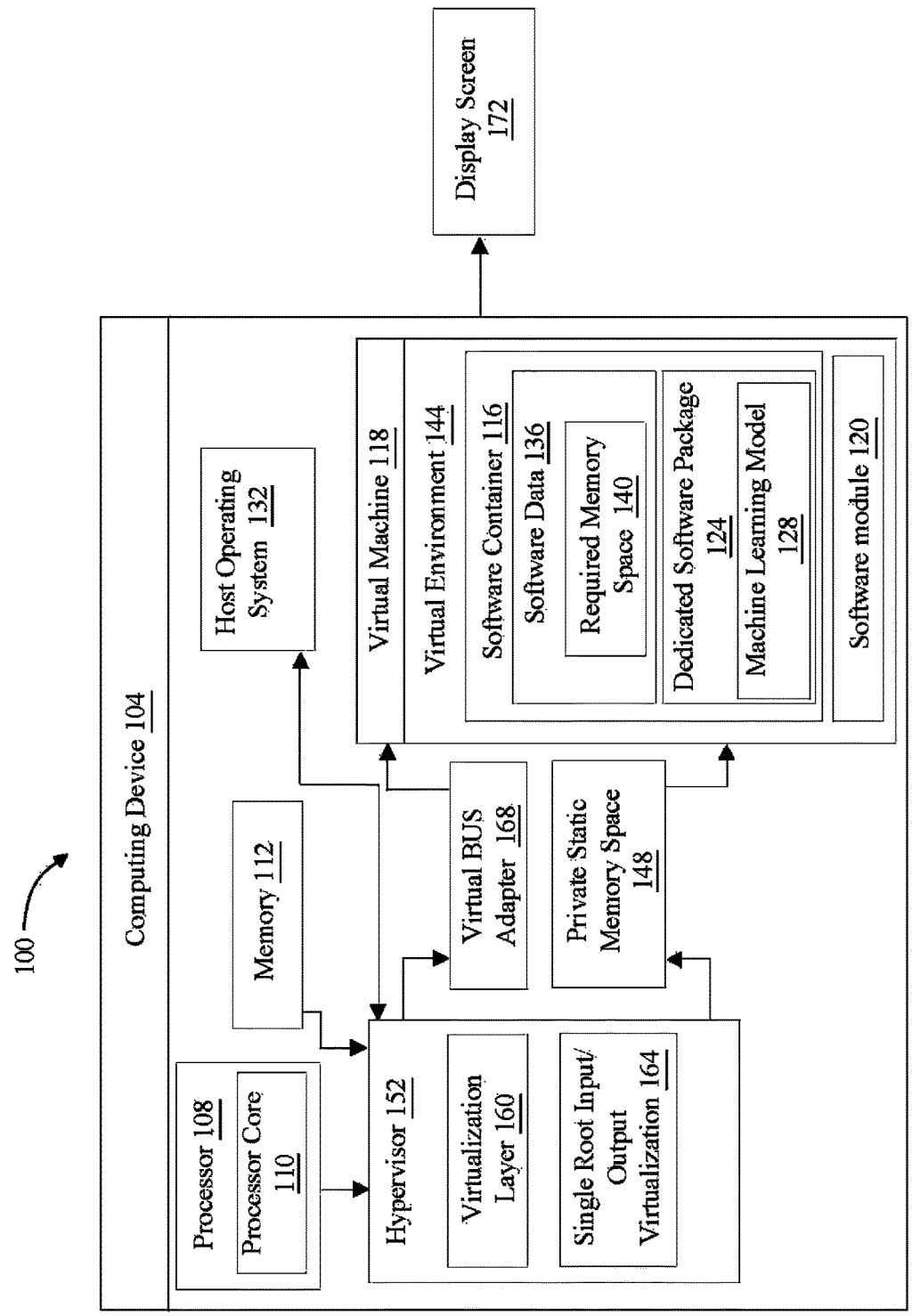
FIG. 1 is a block diagram of an exemplary embodiment of a system for providing a safety critical operating environment container architecture.

Referring now to FIG. 1, a system 100 for providing a safety critical operating environment container architecture system is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores 110 and/or individual processing units. "Processing unit" for the purposes of this disclosure is a device that is capable of executing instructions and performing calculations for a computing device. In one or more embodiments, processing unit be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores 110, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, system 100 may include a host circuit. Host circuit may include at least a processor 108 communicatively connected to a memory. As used in this disclosure, a "host circuit" is an integrated circuit or a collection of interconnected circuits designed to manage, control, and/or interface with one or more functionalities in a system 100. In a non-limiting example, host circuit may be configured as a primary platform or base that provides essential infrastructure, resources, and interfaces to facilitate the operation of other connected or integrated components. Hosting circuit may include any computing device 104 as described in this disclosure, including without limitation a microcontroller, microprocessor 108, digital signal processor 108 (DSP) and/or system 100 on a chip (SoC) that provide one or more services, resources, or data to other computing devices. Host circuit may include, be included in, and/or communicate with a mobile device such as a mobile telephone or smartphone. Host circuit may include a single computing device 104 operating independently or may include two or more computing device 104 operating in concert, in parallel, sequentially or the like; two or more computing devices may be included together in a single computing device 104 or in two or more computing devices. In some cases, host circuit may include but is not limited to, for example, a computing device 104 or cluster of computing devices in a first location and a second computing device 104 or cluster of computing devices in a second location. In other cases, host circuit may include a main unit or a primary circuit in a network that controls communications and/or provide a central point of interface.

With continued reference to FIG. 1, processor 108 may be configured to receive and/or generate one or more software containers 116. A "software container" for the purposes of this disclosure is an executable package that is capable of running software within an isolated space. For example, and without limitation, software container 116 may include a document drafting software wherein the software container 116 may contain any information, runtime environment and the like necessary to execute the document drafting software on more than one operating systems. In one or more embodiments, software containers 116 may create a virtualized environment wherein a software may run within the virtualized environment. "Virtualized Environment" for the purposes of this disclosure is a system in which software may be isolated while still operating on a host operating system. For example, and without limitation, software container may operate in a virtualized environment wherein a software within software container 116 may not communicate with the host operating system. In one or more embodiments, software container 116 may allow for OS virtualization wherein a software may be isolated from a host operating system while still sharing the host operating system kernel. "Operating system (OS) level virtualization" for the purposes of this discourse is a system in which an operating system kernel allowed the existence of multiple isolated environment. In OS virtualization, a software within software container may not have access to resources of the host operating system. Instead, the software may only have access to the contents within software container 116. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container 116 may transmit the commands to the processor. In one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor as described in further detail below. In one or more embodiments, application virtualization may include a process in which the application does not rely on the host operating system kernel. In one or more embodiments, software container 116 may contain OS level virtualization wherein a software within software container may be executed in a virtualized environment. In one or more embodiments, software container 116 may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container 116 may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database, and the like. In one or more embodiments, a software within software container 116 may operate in a runtime environment wherein the software may be isolated for the host operating system. In one or more embodiments, software container 116 may allow for an application to be executed and/or deployed on multiple operating systems. In one or more embodiments, software container 116 may contain libraries, configuration files, binary code and/or any other information that is necessary to execute the application and/or software. In one or more embodiments, a software container 116 may contain some degree of independence from the operating system and/or host system 100 wherein the software container 116 does not rely on the operating system for any information needed to properly deploy an application within software container 116. In one or more embodiments, operating systems may lack the proper functionalities to execute an application, wherein software container 116 may be used to ensure that any necessary functionalities, information, and the like are self-contained. In one or more embodiments, software container 116 may contain a container image, wherein the container image is a portable executable image combined with a manifest that is used by a container manager to deploy the container image on an operating environment with appropriate data services and restrictions. In one or more embodiments, software container 116 may contain restrictions and/or instructions on how a software may communicate with the operating system in which it is deployed on. In one or more embodiments, software container 116 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system 100 management tools.

With continued reference to FIG. 1, software container 116 may contain a software module 120. A "software module," for the purposes of this disclosure, is an application or software that is sought to be executed. For example, and without limitation, software module 120 may include a web browser, word processing software, a media player, a digital calculator, flight systems software, military software and the like. In one or more embodiments, software module 120 may include an application that is sought to be executed within software container 116. In one or more embodiments, any data and/or information within software container 116 may be used to ensure proper execution of software module 120. In one or more embodiments, software container 116 may contain libraries, dependencies, and the like to ensure proper execution of software module 120. In one or more embodiments, software module 120 may include an executable file.

With continued reference to FIG. 1, software container 116 may contain one or more dedicated software packages 124. In one or more embodiments, software container 116 may contain a plurality of dedicated software packages 124. "Dedicated software package" for the purposes of this disclosure are components that are necessary to execute software module 120. For example, and without limitation, dedicated software package 124 may include a library or a plurality of libraries wherein the libraries contain pre-written code that be called by various software and/or applications such as software module 120. In one or more embodiments, software module 120 may utilize code that has already been written wherein software module 120 may execute prewritten code. In one or more embodiments, dedicated software package 124 may include libraries, dependencies in which the software module 120 relies on to operate and the like. In one or more embodiments, dedicated software packages 124 may be configured to facilitate execution of software module 120. In one or more embodiments, dedicated software package 124 may include various software configurations for software module 120. "Software configuration" for the purposes of this disclosure refer to instructions and parameters that define how the software module 120 should operate. For example, and without limitation, a software configuration may include instructions on how software module 120 may startup, how software module 120 may interact with a network, where data should be stored if any, authorized users. Maximum or minimum CPU requirements, security policies and the like. In one or more embodiments, dedicated software package 124 may further include a runtime environment in which software module 120 is executed within. "Runtime environment" or a "container runtime" for the purposes of this disclosure is a platform that allows software container 116 to be executed on a host operating system 132. For example, and without limitation, A container runtime may be used to execute software module 120 within software container 116 and configured to provide isolation between software container 116 and the host operating system 132. In one or more embodiments, a container runtime may be responsible for executing software container 116 and all of its necessary dedicated software packages 124. In one or more embodiments, container runtime may be situated on a host operating system 132 and configured to execute software container 116. In one or more embodiments, container runtime may provide a platform in which software module 120 may be executed. In one or more embodiments, container runtime may be configured to isolate software module 120 from a host operating system 132.

With continued reference to FIG. 1, dedicated software package 124 may further include one or more software defined intelligent networking (SDIN) systems. "Software defined network" (SDN) for the purposes of this disclosure is a system 100 in which virtual networks can be created to direct traffic on a network. In contrast to hardware devices such as routers which may control a network through hardware, SDN may be used to control a network through software. In one or more embodiments, SDN may be used to control a network wherein data packets may be routed using SDN. In one or more embodiments, SDN may act as an intermediary between an application or software and a network wherein the SDN may control the software interacts with the network. SDN may be used to monitor and control network conditions. In one or more embodiments, SDN may be used to manage network resources for various software containers 116. Software containers may be limited in network resources due to their level of importance; such that less important software containers 116 do not crowd a network for less important matters. "Software defined intelligent network" (SDIN) for the purposes of this disclosure, is an SDIN which utilizes artificial intelligence and machine learning to optimize the performance of a network. In SDIN, machine learning may be used to predict issues, predict network demands and adjust the network accordingly. In some cases, SDIN may be used to ensure that software containers 116 do not interact with one another. An SDIN controller may be used to interact with a network. The SDIN controller may monitor network traffic and make decision to optimize traffic for software container 116. In one or more embodiments, SDIN may ensure enable dynamic mesh networks, and facilitate assured, secure data sharing across Link-16, BFT, 4586, and RAC2.

With continued reference to FIG. 1, dedicated software package 124 may include one or more machine learning models 128, wherein the machine learning models 128 may be configured to operate independent of a data source connection. In one or more embodiments, software container 116 and/or dedicated software package 124 may include a machine learning module to implement one or more algorithms or generate one or more machine-learning models 128 to generate outputs. However, the machine learning module is exemplary and may not be necessary to generate one or more machine learning models 128 and perform any machine learning described herein. In one or more embodiments, one or more machine-learning models 128 may be generated using training data. Training data may include inputs and corresponding predetermined outputs so that a machine-learning model 128 may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from libraries, dependencies and the like contained within software container 116 or be provided by a user. In other embodiments, a machine-learning module may obtain a training set by querying a communicatively connected database that includes past inputs and outputs. Training data may include inputs from various types of databases, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model 128 and/or any other machine learning model 128 using training data. Training data may be data sets that have already been converted from raw data whether manually, by machine, or any other method. In some cases, the machine learning model 128 may be trained based on user input. For example, a user may indicate that information that has been output is inaccurate wherein the machine learning model 128 may be trained as a function of the user input. In some cases, the machine learning model 128 may allow for improvements to computing device 104 such as but not limited to improvements relating to comparing data items, the ability to sort efficiently, an increase in accuracy of analytical methods and the like. In one or more embodiments, the machine learning models 128 may operate independent of a data source connection wherein dependencies, training data, libraries and the like may be contained within software container 116.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, dependencies within software container 116 and/or be provided by a user. In other embodiments, machine-learning module may obtain a training set by querying a communicatively connected database that includes past inputs and outputs. Training data may include inputs from various types of databases, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories.

With continued reference to FIG. 1, each software container 116 may contain a self-contained machine learning model 128 wherein training data may be contained within the software container 116 as well. In one or more embodiments, software container 116 may be connected to a database upon execution of software module 120 wherein training data may be retrieved from the database. In one or more embodiments, each software container 116 may contain training data specific to each software module 120. For example, and without limitation, a first software container 116 may contain a first machine learning model 128 and a first training data set, and a second software container 116 may contain a second machine learning model 128 and a second training data set. In one or more embodiments, containerization of a machine learning model 128 as well as training data may allow for portability of software module 120. In one or more embodiments, software container 116 may contain an application program interface (API) that is configured to allow software module 120 and the machine learning model 128 to interact with one another. In one or more embodiments, the machine learning model 128 may contain its own libraries, dependencies and the like. in one or more embodiments., software container 116 may contain the requisite code to call and implemented the machine learning model 128 into software module 120.

With continued reference to FIG. 1, software container 116 may contain a container image wherein the container image is an executable image combined with a manifest that is used by the container manager to deploy the executable image on an operating with appropriate data services and restrictions. In one or more embodiments, container image may include software module 120 and any dedicated software packages 124 needed to execute software module 120. In one or more embodiments, the container runtime has the ability to deploy container images on the operating system. The container runtime may interface with container image repositories, validate the authenticity of container images, loads container executables into container environments, connect container environments to operating service, and exports management APIs to system 100 management tools. In one or more embodiments, the container run time may create a container environment, which is an isolated space having allocated data services requested by the container runtime and created by the operating system contents contained within container images and deployed by the container runtime. The Namespace controls are the operating systems soft partitioning feature set. The operating system provides the ability to restrict the visibility of operating system features and resources and limit the capacity of resources allocated to processes.

With continued reference to FIG. 1, software container 116 may contain any necessary information for execution of software module 120 on one or more differing computing systems and/or operating systems. In one or more embodiments, a containerization tool may be used to generate software container 116. In one or more embodiments, the containerization tool may receive dedicated software packages 124, software module 120, software data 136 and/or any other information necessary to execute software module 120 and generate a container image. In one or more embodiments, the generation of software container 116 and/or container image may be referred to as a containerization process. In one or more embodiments, software container 116 and/or container image may be executed using container runtime. Container runtime may be situated on host system 100 in which software container 116 is seeking to be deployed. In one or more embodiments, container runtime may be referred to as a "container manager." In one of or more embodiments, container runtime may be configured with managing execution of software container 116. In one or more embodiments, container runtime may provide an interface for executing software container 116 and stopping software container 116. In one or more embodiments, container runtime may be configured to isolate software container 116 from other containers on a host operating system 132. In one or more embodiments, an isolation of software container 116 from a host operating system 132 may be achieved by providing dedicated namespaces for each software container 116. In one or more embodiments, dedicated namespaces may allow for isolation of software module 120 from a host operating system 132. In one or more embodiments, a dedicated namespace may ensure that retrieved functions, codes, instructions, and the like are limited to information within contained software container 116 and not the host operating system 132. In one or more embodiments, container runtime may further isolate software container 116 by managing and limiting resources to software container 116, such as but not limited to, processing resources, memory resource and the like. In one or more embodiments, container runtime may be configured to limit resources to each software container 116 on a host operating system 132 in order to ensure that resources are not entirely consumed by a single software container 116. In one or more embodiments, software container 116 may contain various runtime configurations which may limit resources, contain information about networks and/or any other information related to the behavior of software module 120 within software container 116.

With continued reference to FIG. 1, software container 116 and/or container image may include a pre-defined operational rule. As used in this disclosure, a "pre-defined operational rule" is a set of instructions or conditions that dictate how the software, when executed, should behave, respond, or operate under specific scenarios or environment. In a non-limiting example, pre-defined operational rule may encapsulate business logic or functional requirements of the software. In some cases, pre-defined operation rule may specify a plurality of core functionalities and processes the software is intended to perform. In some cases, pre-defined operational rule may include one or more error handling procedures i.e., how software should respond to unexpected inputs or errors. In some cases, pre-defined operational rule may include one or more security protocols such as, without limitation, instructions related to authentication, authorization, data protection, and/or the like. In some cases, pre-defined operational rule may, additionally, or alternatively, include one or more conditions and/or thresholds for software performance e.g., response times, execution times, and/or the like. In an embodiments, pre-defined operation rule may be configured as a metric to ensure that the software application behaves in a pre-defined way. In another embodiment, pre-defined operation rule 1 may dictate fail-safe behaviors or fallback procedures. In a non-limiting example, a pre-defined operation rule may dictate how a software application should respond if one or more sensors communicatively connected to computing device 104 detects a certain anomaly in flight data during cruising e.g., automatically engaging an emergency procedure. In another non-limiting example, a pre-defined operational rule may specify the process and validations for pilot inputs. In some cases, missing pre-defined operation rule may result in a failure of executing at least a part of the software application. In some cases, pre-defined operational rule may entirely depend on system 100 health and safety; for example, and without limitation, pre-defined operational rule may be qualified under DO-178C or to ensure the availability, robustness, and integrity of the SOE.

With continued reference to FIG. 1, software container 116 may be configured to be executed on a host operating system 132. "Host operating system" for the purposes of this disclosure is the operating system of the computing device 104 in which software container 116 will be executed on. For example, and without limitation, in instances where software container 116 is executed on a Linux operating system, Linux may be referred to as the host operating system 132. In one or more embodiments, software container 116 may be executed on a plurality of host operating systems. In one or more embodiments, software container 116 may be executed on host operating system 132 using container runtime. In one or more embodiments, container runtime may virtualize software module 120 within software container 116 by ensuring that a software within software container 116 is independent of the host operating system 132.

With continued reference to FIG. 1, in or more embodiments, software container 116 may contain software data 136. "Software data" for the purposes of this disclosure is information indicating the computing requirements necessary to properly execute container. For example, and without limitation, software data 136 may contain information indicating the file size of software container 116 wherein a host operating system 132 must contain a storage space larger than the file size of software container 116 for software container 116 to be properly executed. In one or more embodiments, software data 136 may contain information indicating various operating systems in which software container 116 is compatible with. In one or more embodiments, software data 136 may contain the minimum processing power that may be needed for proper execution of software container 116. In one or more embodiments, software data 136 may be used to properly allocated resources for software container 116. In one or more embodiments, computing device 104 and/or container runtime may receive software data 136 and allocate a particular amount of memory, processing power and the like for software container 116. In one or more embodiments, software data 136 may be received by an aggregate of metadata contained within software container 116. For example, and without limitation, software data 136 may include an aggregate file size of all information within software container 116. In one or more embodiments, software module 120 may contain various resource requirements wherein the resource requirements may be received as software data 136. In one or more embodiments, software data 136 may contain a required memory space 140. "Required memory space" for the purposes of this disclosure is a particular amount of memory that is needed to properly instantiate software container 116. For example, and without limitation, required memory space 140 may include two gigabytes, wherein a computing system 100 must contain at least two gigabytes for software container 116 to properly execute. In one or more embodiments, required memory space 140 may include an indication of the amount of private memory and/or secondary memory needed for proper functioning of software module 120 within software container 116. In one or more embodiments, required memory space 140 may contain a required amount of storage space for a virtual machine 118 prior to installation of an operating system in the virtual machine 118. In one or more embodiments, required memory space 140 may contain a required amount of storage space for a virtual environment 144 after an operating system has already been installed.

With continued reference to FIG. 1, software data 136 may include a partition policy. A "partition policy," for the purpose of this disclosure, is rules, constraints, and configurations for how a partition (or a virtual machine 118/container) within virtual environment 144 accesses resources. In some cases, at least a partition policy may specify how much CPU, memory, storage, network bandwidth and/or the like a partition in question can utilize. In some cases, at least a partition policy may also determine the scheduling policy for a partition, for example, the partition's priority, operating time, or whether it's preemptible. In an embodiment, at least a partition policy may define a level of separation between plurality of partitions to ensure that one partition's operation doesn't adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system 100, at least a partition policy may be configured to ensure that a partition handling flight control logic gets a highest priority and is isolated from partitions handling non-critical tasks e.g., in-flight entertainment. In another non-limiting example, partition policies may balance computing resources allocation for achieving a desired system 100 performance e.g., desired energy efficiency, ensuring that each virtual machine 118 only the resources it needs.

With continued reference to FIG. 1, software container 116 may be periodically modified and/or updated. In one or more embodiments, a modification and/or update of a software may be limited to the operating system in which the software is running. In one or more embodiments, modifications and/or updates of a software may be specific to each operating system in which the software is located. In one or more embodiments, modification and/or update of software container 116 may allow for application of updated software container 116 on one or more operating system platforms. In one or more embodiments, additional software may be added to software container 116 wherein execution of software container 116 in a future instances may include added software. In one or more embodiments, data volumes may be added to software container 116 wherein software module 120 may access data volumes. "Data volume" for the purposes of this disclosure is data that can be accessed by a software container 116. In one or more embodiments, data volume may be stored on a host operating system 132 wherein software container 116 may access data volume and transmit and/or receive information. In one or more embodiments, data volume may include information such as but not limited to log files, additional libraries, various information and the like. In one or more embodiments, data volume may include databases which can be accessed by storage container. In one or more embodiments, data volume may allow for the storage of data generated by software container 116.

With continued reference to FIG. 1, in one or more embodiments, software container 116 may be associated with a design assurance level classification (DAL). "Design assurance level classification" for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, software data 136 may contain DAL certification of software container 116. In one or more embodiments, software container 116 may contain software modules 120 associated with aviation and/or military technology, wherein each software container 116 may contain DAL classification. For example, and without limitation, software container 116 may include software such as engine control systems, inflight entertainment, missile guidance systems, fuel monitoring systems and the like.

With continued reference to FIG. 1, computing device 104 may receive software container 116 from a user. "User" for the purposes of this disclosure is an individual interacting with computing device 104 and seeking execution of software container 116. In one or more embodiments, computing device 104 may receive software container 116 from a secondary memory communicatively connected to computing device 104, from a database communicatively connected to computing device 104, from a portable memory drive such as a USB memory stick and the like. In one or more embodiments, computing device 104 may receive one or more software containers 116 wherein each software container 116 may be associated with a separate and distinct software module 120. In one or more embodiments, one or more software containers 116 may be located on computing device 104 wherein selection of a software container 116 may indicate receipt of a software container 116. In one or more embodiments, more than one selection may be made simultaneously wherein computing device 104 perform one or more actions simultaneously. In one or more embodiments, receipt of software container 116 may indicate a placement of one or more software containers 116 on a host operating system 132.

With continued reference to FIG. 1, in one or more embodiments, computing device 104 is configured to generate and/or create a separate virtual environment 144 for each software container 116. "Virtual environment" for the purposes of this disclosure is a self-contained environment within a computing device 104 that allows for the isolation of one or more software from the host operating system 132. For example, and without limitation, a virtual environment 144 may include a separate and isolated operating system on computing device 104 that does not interact with the host operating system 132. In one or more embodiments, virtual environment 144 may include an environment located on a virtual machine 118. Host operating system includes a primary operating system installed on a computing device 104 hardware. In some cases, host operating system 132 may manage underlaying physical resources and facilitate the running of one or more guest operating systems (guest OS). In a non-limiting example, Linux operating system running on computing device 104 as the primary operating system may be the host operating system 132. Software applications integrated to computing device 104 as described herein may be run atop Linux operating system. In some cases, virtual environment 144 may be software-defined, for example, and without limitation, virtual environment 144 may include a simulated operating system that operates independently of the underlaying physical hardware of computing device 104. In some cases, virtual environment 144 may emulate one or more hardware, software, networks, or a combination thereof. In a non-limiting example, a plurality of partitions may be allocated inside of virtual environment 144, wherein each partition may include a virtual machine 118 (VM). "Virtual machine," for the purpose of this disclosure, is a software-based emulation of a computer system 100 that is capable of running one or more software applications as if they were running on physical hardware. For instance, and without limitation, virtual environment 144 may include a separate and isolated operating system on computing device 104 that does not interact with host operating system 132.

In one or more embodiments, a virtual machine 118 may be used to create and execute an operating system that is separate and isolated from the host operating system 132. In one or more embodiments, virtual machine 118 may allow for the creation of virtual environments 144. In one or more embodiments, generation of a virtual environment 144 may include allocation of memory space on memory on computing device 104. "Memory allocation" for the purposes of this disclosure is the process of reserving computer space for a particular purpose. In one or more embodiments, memory may be allocated for generation of a virtual environment 144. In one or more embodiments, memory allocation may be static wherein a predefined amount of space if reserved and cannot be modified. For example, and without limitation, in a static memory allocation, if a virtual environment 144 is given 2 gigabytes of memory, the memory cannot be increased or decreased. In one or more embodiments, memory allocation may be dynamic wherein memory may be continuously increased based on the demands of the virtual environment 144. In one or more embodiments, memory may be allocated in order to ensure that a virtual environment 144 contains the proper amount of space in order to perform its intended functions. In one or more embodiments, creation of a virtual environment 144 may include creation of a guest operating system using virtual machine 118.

In one or more embodiments, memory allocation may include a process of reserving memory space on the host operating system 132 for use within the virtual environment 144. In one or more embodiments, memory allocation may further include partitioning of memory wherein the memory may be portioned into more than one parts. In one or more embodiments, memory may be partitioned into a root partition (also known as a parent partition) and one or more child partitions. The root partition may contain the operating system while the child partitioning contain the virtual environments 144. In one or more embodiments, management of the child partitions may be done through the root partition. In one or more embodiments, computing device 104 may be configured to partition memory into more than one or child partitions wherein each child partition may be associated with a separate software container 116. "Partition" for the purposes of this disclosure refers to a separated section of physical hardware on computing device 104. For example, and without limitation, a memory may be split into several partitions wherein each partition may be used for separate and distinct storage tasks. In one or more embodiments, one or more various physical hardware components may be partitioned such as but not limited to a processor 108, a primary memory, a secondary memory, a network device and the like. In one or more embodiments, partitioning may include the use of disk management software and/or other partitioning software that may allow for the splitting of a physical hardware component into one or more separate partitions.

With continued reference to FIG. 1, virtual environment 144 may be created on host operating system 132. In one or more embodiments, in instances where virtual environment 144 is generated on a host operating system 132, the virtual environment 144 must communicate with the host operating system 132 to receive resources such as computing power, memory space and the like. In one or more embodiments, one or more virtual environments 144 may be generated using a hypervisor 152. A "hypervisor" for the purposes of this disclosure is a software module which is configured to create and manage virtual machines 118. In one or more embodiments, hypervisor 152 may create one or more virtual machines 118 wherein each virtual machine 118 may host a separate and isolated virtual environment 144. In one or more embodiments, each virtual environment 144 may contain a separate and isolated operating system. In one or more embodiments, a hypervisor 152 may run on the host operating system 132 wherein the hypervisor 152 may generate virtual machines 118 on the host operating system 132. In one or more embodiments, a hypervisor 152 may run directly on the hardware of a computing device 104 without reliance on an operating system. In one or more embodiments, a hypervisor 152 that runs independent of a host operating system 132 may be referred to as a "Type 1" and/or "bare metal" Hypervisor. In one or more embodiments, in a bare metal hypervisor 152, the hypervisor 152 is directly installed on the hardware of computing device 104 rather than through the operating system. In one or more embodiments, a type 1 hypervisor 152 may partition resources, such as memory processing power and the like for each virtual machine 118. In one or more embodiments, virtual machines 118 may communicate directly with the hardware of computing device 104 rather than the host operating system 132. In one or more embodiments, in a bare metal hypervisor 152 virtual machines 118 are not susceptible to issues caused by the host operating system 132 and/or other virtual machines 118. In one or more embodiments, virtual machines 118 may be isolated and unaware that other virtual machines 118 exist. In one or more embodiments, a bare metal hypervisor 152 may allow for increased performance wherein virtual machines 118 may communicate directly with hardware rather than through the intermediate host operating system 132. In one or more embodiments, a bare metal hypervisor 152 may allow multiple virtual machines 118 to run simulates wherein failure of one virtual machine 118 may not result in a failure of a second virtual machine 118. In one or more embodiments, in a type 2 hypervisor 152, partitioning and resource allocation may occur above the host operating system 132 layer, whereas in a type 1 hypervisor 152 partitioning may occur below the host operating system 132 and directly with the hardware of computing device 104. In one or more embodiments, in a type 2 hypervisor 152, virtual environments 144 may rely on the host operating system 132 for proper resource allocation and memory allocation whereas in a type 1 hypervisor 152, virtual environments 144 may only rely on the hardware.

In one or more embodiments, hypervisor 152 may include a software configured as a virtual machine monitor (virtual machines 118). In some cases, hypervisor 152 may be configured to allow a physical machine (host) such as computing device 104 to run a plurality of operating systems simultaneously by virtualizing system 100 hardware e.g., processors 108, memory, I/O devices, and/or the like. In a non-limiting example, hypervisor 152 may create one or more virtual machines 118 wherein each virtual machine 118 may host a separate and isolated software operating environment (SOE). In some cases, hypervisor 152 may run directly on the hardware of computing device 104 without reliance of an operating system. Instantiating hypervisor 152 may include launching or initializing hypervisor 152 in host operating system 132. In some cases, instantiation of hypervisor 152 may create virtual environment 144 wherein a plurality of partitions (i.e., virtual machines 118) can be run and managed. In an embodiment, hypervisor 152 may include a "type 1 hypervisor" that may run independently of host operating environment. In a non-limiting example, hypervisor 152 may include a bare metal hypervisor 152 that runs directly on the computing device 104 hardware and manages one or more quest operating systems. Exemplary type 1 hypervisor 152 may include, without limitation, MICROSOFT HYPER-V, VMWARE ESXI, XEN, and/or the like. In some cases, virtual machines 118 created by type 1 hypervisor 152 may communicate directly with the hardware of computing device 104 rather than host operating system 132. In some cases, virtual machines 118 created by type 1 hypervisor 152 may not be susceptible to issues caused by the host operating system 132 and/or other virtual machines 118 in virtual environment 144. In a non-limiting example, one or more virtual machines 118 may be isolated and unaware of existence of other virtual machines 118. In an embodiment, type 1 hypervisor 152 may allow for an increased performance wherein virtual machines 118 within virtual environment 144 may communicate directly with hardware rather than through the intermediate host operating system 132. In a non-limiting example, type 1 hypervisor 152 may allow one or more virtual machines 118 to run simultaneously, wherein the failure of a first virtual machines 118 may not result in a failure of a second virtual machines 118.

With continued reference to FIG. 1, in another embodiment, hypervisor 152 may include a "type 2 hypervisor" that runs atop host operating system 132 similar to any other software applications. In one or more embodiment, hypervisor 152 may include a hosted hypervisor 152 having resource allocation occurred right above host operating system 132. In some cases, type 2 hypervisor 152 may rely on host operating system 132 of computing device 104, whereas in type 1 hypervisor 152 as described above, may only rely on the hardware of computing device 104. Exemplary type 2 hypervisor 152 may include, without limitation, VMWARE WORKSTATION, ORACLE VIRTUAL BOX, and/or the like. In some cases, when instantiating type 2 hypervisor 152, processor 108 may launch type 2 hypervisor 152 that has been pre-installed similar to launching any software application. Once host OS is up and running, processor 108 may then start type 2 hypervisor 152 to create, manage and run virtual machines 118 atop the host OS; however, for type 1 hypervisor 152, since it runs directly on "bare metal" (i.e., hardware without requiring an underlying operating system), instantiating type 1 hypervisor 152 may involve booting the system 100 from a medium such as, without limitation, a USB drive, CD, or a network source containing hypervisor 152. Once booted, hypervisor 152 may take control of at least a portion of hardware resources and manage and/or launch one or more virtual machines 118.

With continued reference to FIG. 1, processor 108 may then generate a virtualization layer 160 supervised by hypervisor 152, wherein a host operating system 132 within virtual environment 144 is operated by the virtualization layer 160. As used in this disclosure, a "virtualization layer" is a software layer (or interface) that sits between hardware layer (e.g., physical CPU, memory, I/O devices, and/or the like) and virtual environment 144 having one or more virtual machines 118. In some cases, virtualization layer 160 may be configured to virtualize the underlaying hardware resources and present the virtualized hardware resources to plurality of virtual machines 118 as though they are dedicated to each virtual machine 118. In a non-limiting example, a plurality of partitions of a single physical hardware component as described herein may share the same physical hardware resources through virtualization layer 160, without being aware of each other. In some cases, virtualization layer 160 may be instantiated when hypervisor 152 is booted or launched. In a non-limiting example, in case of a type 1 hypervisor 152, virtualization layer 160 may be generated when machine starts up since hypervisor 152 directly interface with hardware. In another non-limiting example, in case of a type 2 hypervisor 152, virtualization layer 160 may be established once hypervisor 152 software is initiated on top of host OS. In some cases, hypervisor 152 may be configured to monitor and manage one or more hardware abstraction and allocate these virtualized resources to designated virtual machines 118. In a non-limiting example, virtualized resources may include CPU time, memory space, I/O operations and/or the like. In some cases, virtualized resources may be allocated based on partition policy as described in detail below. In some cases, hypervisor 152 may manage the scheduling of virtual machines 118 tasks on actual cores. In some cases, hypervisor 152 may handle interruptions, exceptions, and any events that occur, deciding which virtual machines 118 or service needs attention. In some cases, hypervisor 152 may be configured to isolate one or more virtual machines 118 from rest of virtual machines 118 to maintain system 100 security and stability. In other cases, hypervisor 152 may be configured to manage lifecycle operations of one or more virtual machines 118 such as, without limitation, creation, modification, deletion, migration, and/or the like.

With continued reference to FIG. 1, in one or more embodiments, one or more physical hardware components of computing device 104 may be partitioned. In one or more embodiments, one partition of the plurality of partition may contain host operating system 132. In one or more embodiments, host operating system 132 may be used to manage hypervisor 152, instantiate virtual machines 118 and the like. In one or more embodiments, host operating system 132 may operate on primary partition and/or a parent partition wherein virtual machines 118 may operate on child partitions. In one or more embodiments, management of hypervisor 152 may occur on host operating system 132. In one or more embodiments, one or more processes as described herein may occur on host operating system 132 prior to being implemented within child partitions.

With continued reference to FIG. 1, in a non-limiting example, when host operating system 132 is created, a pre-defined set of virtual hardware resources may be provided by virtualization layer 160, wherein the pre-defined set of virtual hardware resources may include, but is not limited to processor cores 110, portion of virtualized memory, virtual disks, virtual network interfaces, among others. As host operating system 132 attempts to execute one or more operations or access its "hardware," host operating system 132 may interface with virtualization layer 160, for instance, and without limitation, when virtual machine 118 tries to use processor 108, it may be scheduled by hypervisor 152 onto physical processor 108 on computing device 104 through virtualization layer 160. In some cases, host operating system 132 may receive these resources as if they are dedicated hardware components, oblivious to the abstraction layer beneath. In some cases, virtualization layer 160 may handle I/O operations, translating virtual disk or network accesses to actual operations on the physical hardware. Any interruption, exception, or system 100 call made by host operating system 132 may be intercepted by virtualization layer 160 which then communicates with hypervisor 152 to handle or service that request.

With continued reference to FIG. 1, in some cases, a plurality of partitions may include at least a dedicated partition, wherein one or more I/O operations may be consolidated into the at least a dedicated partition. In some cases, such partition may include a specialized virtual machine 118 that is configured to manage and handle I/O operations for other virtual machines 118, acting as an intermediary between plurality of partitions and/or quest virtual machines 118 and physical hardware resources through an I/O physical bus e.g., a virtualized PCI bus that connects devices to main system 100. In a non-limiting example, at least a dedicated partition may include a I/O virtual machine 118 containing a plurality of FACE I/O service segments (IOSS), wherein each IOSS may provide a standardized interface between OSS and platform-specific hardware. I/O virtual machine 118 may be configured to manage all I/O operations in adherence to FACE technical standards as described above. In a non-limiting example, through plurality of IOSS, I/O virtual machine 118 may include a virtual machine 118 that interface directly with platform's avionic hardware connected to computing device 104 in a way that is standardized across different air vehicles and systems. In some cases, standardized device drives and/or adapters may be provided by IOSS for various avionic devices. For example, when a quest virtual machine 118 or a software application integrated into the system 100 as described below wants to access a hardware resources, it may be configured to indirectly communicate with the I/O virtual machine 118, plurality of IOSS having standardized drivers for the hardware may process the request as per pre-defined system 100 specification (e.g., FACE specification). In these cases, other partitions or virtual machines 118 may be less susceptible to I/O-related faults or security breaches. Security protocols may be standardized and attach surface may be reduced by centralizing drivers and I/O operations since other virtual machines 118 do not directly access I/O hardware, reducing potential vulnerabilities. In other cases, updates, or changes to one or more I/O device drivers or I/O related services may be done in I/O virtual machine 118 without affecting or rebooting the rest of virtual machines 118.

With continued reference to FIG. 1, hypervisor 152 may include single root input output virtualization (SR-IOV) 164. "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV 164 may include the virtualization of physical components such as but not limited to, a GPU, network adapter, storage controllers, FPGA devices, audio processing cards, solid state drives and the like. In one or more embodiments, SR-IOV 164 may allow for virtual machines 118 to access a single physical device. In one or more embodiments, multiple virtual machines 118 may have direct access to a physical device without an operating system allocating resources. In one or more embodiments, SR-IOV 164 may allow for the sharing of resources, such as for example network adapters, while still maintaining independence. In one or more embodiments, SR-IOV 164 may allow for multiple virtual machines 118 operating on a type 1 hypervisor 152 to have access to physical devices without an intermediary such as a shot operating system. In one or more embodiments, computing devices may contain physical hardware that is capable of virtualization. In one or more embodiments, hypervisor 152 may contain the proper systems and/or software to enable SR-IOV 164 wherein each virtual machine 118 may receive a virtual component. In one or more embodiments, SR-IOV 164 may allow for one or more separate virtual environments 144 with direct access to one or more physical hardware components of computing device 104. In one or more embodiments, hypervisor 152 may include one or more virtual binary unit system 100 (BUS) adapters 168. A binary unit system 100 adapter (BUS) for the purposes of this disclosure is a hardware component, such as a cable, that allow communication between one or more physical devices on computing device 104. In one or more embodiments, BUS adapters may include various physical hardware such as but not limited to, USB adapters, graphics card adapters, sound card adapter, network adapter and the like. "Virtual Bus adapter" for the purposes of this disclosure is a software that is configured to mimic a physical BUS adapter and provide a connection between one or more virtual machines 118 and/or containers. For example, and without limitation, Virtual BUS 168 may allow for communication between one or more virtual machines 118 and a network card. In one or more embodiments, BUS adapters may be virtualized to allow for connection of one or more virtual machines 118 to one or more physical devices. In one or more embodiments, virtual BUS 168 may emulate various physical devices wherein one or more virtual machines 118 may connect to the virtual BUS 168. In one or more embodiments, Virtual BUS 168 may include virtualized versions of physical hardware wherein one or more virtual machines 118 may communicate with the one or more virtualized versions and wherein the virtualized versions may then communicate with the physical hardware. In one or more embodiments virtual BUS adapters may allow for increased isolation between one or more virtual environments 144, wherein each virtual environment 144 is connected to a separate virtual BUS adapter.

With continued reference to FIG. 1, computing device 104 is configured to create a separate virtual environment 144 for each of the one or more software containers 116 by allocating a dedicated private static memory space 148. "Dedicated private memory space" for the purposes of this disclosure refers to a partition of a storage device that is reserved exclusively for software container 116. For example, and without limitation, a storage device may include several partitions wherein at least partition may be reserved exclusively for the use of software container 116. "Dedicated private static memory space" for the purposes of this disclosure refers to a partition having a fixed size value. In a static memory allocation, memory and/or storage is allocated prior to partitioning and cannot be changed. In contrast to static memory allocation, dynamic memory allocation allows the allocation and deallocation of memory as needed by a particular software and/or operating system. In one or more embodiments, dynamic memory allocation may lead to memory leaks, memory corruption, buffer overflows and the like. In one or more embodiments, dynamic memory allocation causes other software on a system 100 to depend on one another. In one or more embodiments, static memory allocation may allow for increased security and reliability. In one or more embodiments, each virtual environment 144 may be allocated dedicated private static memory space 148 wherein each dedicated private static memory space 148 includes a partition of memory. In one or more embodiments, each dedicated private static memory space 148 may include a child partition that has been created by the root partition. In one or more embodiments, each dedicated private static memory space 148 may contain its own separate virtual environment 144. In one or more embodiments, creating a separate virtual environment 144 for each of the one or more software may include creating a child partition for each virtual environment 144. In one or more embodiments, dedicated private static memory space 148 may include a guest operating system of virtual environment 144. In one or more embodiments, data located on or within memory 112 may contain unique addresses in order to locate the data on memory 112. In one or more embodiments, memory 112 may contain unique addresses for every portion of a primary or secondary memory. In one or more embodiments, addresses are assigned to various portions of memory to allow for a computing device to read and write within a particular location. In one or more embodiments, memory 112 may be partitioned into multiple partitions wherein each partition may contain a separate portion of memory. In one or more embodiments, each partition may contain its own set of addresses configured to locate each partition. In one or more embodiments, each partition may contain its own range of addresses wherein a starting address may indicate the beginning of the partition and an ending address may indicate the end of the partition. In one or more embodiments, a computing device accessing a partition may be given the beginning address and the end address of the partition. In one or more embodiments, In one or more embodiments, a partition such as dedicated private static memory space may contain an upper limit wherein the upper limit contains the maximum capacity that may be allocated to the partition. In one or more embodiments, a partition may not exceed an upper limit such that the partition is allocated more storage and/or memory that may be contained on memory 112. In one or more embodiments, each partition may contain a lower limit wherein each partition must be of a minimum value in order to allow for the storage of metadata and other critical information. In one or more embodiments, allocating dedicated memory space may include comparing the allocated memory space to an upper limit and lower limit.

With continued reference to FIG. 1, computing device 104 may be configured to create a separate virtual environment 144 for each of the one or more software containers 116 by allocating a dedicated private static memory space 148 as a function of the software data 136, wherein the separate virtual environment 144 comprises a dedicated operating system. In one or more embodiments, software data 136 may contain a required memory space wherein allocating the dedicated private static memory space 148 for each of the one or more software containers 116 as a function of the software data 136 includes allocating the dedicated private static memory space 148 as a function of the required memory space. In one or more embodiments, computing device 104 may allocate dedicated private static memory space 148 based on a required memory space within software data 136. For example, and without limitation, required memory space may include 2 gigabytes wherein computing device 104 may partition memory to create dedicated private memory space 148 containing two gigabytes. In one or more embodiments, computing device 104 may receive software data 136 upon selection of software container 116 wherein computing device 104 may create dedicated private static memory space 148 as a function of software data 136.

With continued reference to FIG. 1, computing device 104 may be configured to allocate a dedicated primary memory space for each virtual environment 144. "Dedicated primary memory space" for the purposes of this disclosure is a portion of a primary memory that is partitioned and reserved for a particular function. For example, and without limitation, computing device 104 may contain 16 gigabytes of random-access memory (RAM) wherein 2 gigabytes of RAM may be reserved and/or dedicated for a particular virtual environment 144 and/or virtual machine 118. In one or more embodiments, primary memory may be partitioned wherein dedicated primary memory space may include one or more partitions. In one or more embodiments, assigning dedicated primary memory space may occur at a software level, wherein a software operating on a host operating system 132 may allocate RAM to each virtual environment 144. In one or more embodiments, allocating and/or assigning dedicated primary memory space may occur on the hardware level wherein hardware virtualization may allow for partitioning of RAM at a hardware level. In one or more embodiments, partitioning on a hardware level may allow for increased safety wherein the RAM partition is not dependent on the vulnerabilities of the operating system. In one or more embodiments, partitioning on a hardware level may allow for increased independence of the virtual environment 144 from the host operating system 132. In one or more embodiments, partitioning RAM at a hardware level may allow for increased independence and isolation from other virtual environments 144. In one or more embodiments, software data 136 may contain resource requirements wherein the resource requirements may contain a particular amount of RAM required for proper execution of software container 116. In one or more embodiments, computing device 104 may be configured to allocate a dedicated primary memory space based on software data 136. In one or more embodiments, computing device 104 may allocate primary memory space using hypervisor 152 wherein RAM may be allocated prior to initialization of the virtual machine 118 and/or virtual environment 144. In one or more embodiments, allocating primary memory space may depend on a DAL level associated with software container 116. In one or more embodiments, a software module 120 within software container 116 having a higher DAL level may receive more RAM whereas a software module 120 associated with a lower DAL level may receive less RAM and/or dedicated primary memory space.

In one or more embodiments, creating virtual environment 144 may further include assigning at least one dedicated processor core 110 to each separate virtual environment 144. In one or more embodiment, processor 108 may include a multi-core processor 108 wherein each virtual environment 144 may be assigned a dedicated processor core 110. "Dedicated processor core 110" for the purposes of this disclosure is a portion of a multi-core processing component that is reserved exclusively for a particular function. For example, and without limitation, software container 116 may contain a dedicated processor core 110, wherein a single processor core 110 of the multi-core processor 108 may be used exclusively for execution of software container 116. In one or more embodiments, assigning dedicated processor core 110 may allow for independence between two or more virtual environments 144. In one or more embodiments, assigning dedicated processor 108 may allow for minimized communication between two virtual environments 144. In one or more embodiments, assigning dedicated processor core 110 may allow for increased safety wherein failure of a particular processor core 110 and/or virtual environment 144 may be independent of other processor cores 110 and/or virtual environments 144. In one or more embodiment, each software container 116 and/or virtual environment 144 may be assigned at least one dedicated processor core 110. For example, and without limitation, in instances in which 6 virtual environments 144 are created, an 8-core processor 108 may assign one processor core 110 to each virtual environment 144. In one or more embodiments, virtual environments 144 may be assigned additional dedicated processor cores 110 based on software data 136. In one or more embodiments, software data 136 may contain resource requirements indicating the processing power required for software container 116 wherein a particular software container 116 may require more than one processor core 110. In one or more embodiments, assignments of dedicated processor cores 110 may be based on DAL level wherein a software container 116 associated with a higher DAL level may be assigned more than one dedicated processor cores 110. In one or more embodiments, a process of assigning processor cores 110 may be referred to as "CPU pinning". In one or more embodiments, CPU pinning may allow for proper resource allocation wherein a particular software container 116 cannot utilize more resources than it its given. In one or more embodiments, CPU pinning may prevent failures due to multiple software running on similar processor cores 110. In one or more embodiments, CPU pinning may allow for reliable and consistent processing power wherein each virtual environment 144 is given a fixed and independent amount of processing power. In one or more embodiments, computing device 104 may be configured to assigned one or more dedicated processor cores 110 using hypervisor 152. In one or more embodiments, hypervisor 152 may allow for 'pinning' of processor cores 110 to each virtual environment 144, wherein each virtual environment 144 is assigned a dedicated processor core 110. In one or more embodiments, prior to initialization of virtual environment 144, hypervisor 152 and/or computing device 104 may 'pin' and/or assign a dedicated processor core 110 to each virtual machine 118 and/or virtual environment 144.

With continued reference to FIG. 1, computing device 104 may allocate resources of multicore processor 108 for each virtual environment 144. In one or more embodiments, computing device 104 may allocate processing units to each virtual environment 144. For example, and without limitations, computing device may assign registers of processor 108 to each virtual environment. Ion one or more embodiments, registers may be used to store data during execution of one or more functions and/or instructions. In one or more embodiments, allocation of registers may allow for storage space for memory to be stored prior to execution and following execution of tasks. In one or more embodiments, each processor core 110 may contain its own dedicated registers and caches wherein that are separate and isolate from cache and registers of other processor cores 100. In one or more embodiments, separation may allow for increased isolation between two processor cores. In one or more embodiments, allocating processor core 110 may include allocating cache and registers of processor core. In one or more embodiments, cache may include a memory of frequently used instructions wherein processor 108 may be configured to access the instructions for faster processing. In one or more embodiment cache may include level 1 cache and level 2 cache which may be dedicated to each processor core 110. In one or more embodiments, cache may include a level 3 cache that may be shared by multiple processor cores 100. In one or more embodiments, a level 3 cache may contain memory and/or instructions that can be shared amongst multiple cores. In one or more embodiments, level 3 cache may be isolated from each processor core 110 wherein each processor core 110 may be completely isolated from one another. In one or more embodiments level 3 cache may be assigned to a single processor core 110 and/or may be partitioned for each processor core 110 In order to prevent leakage of information from one processor core 110 to another. In one or more embodiments, hypervisor 152 may be configured to partition caches in order to increase isolation amongst virtual environments 144. In one or more embodiments, cache may leak through cache side channel attacks. In one or more embodiments, memory may be encrypted prior to transmission to processor 108 wherein leaked information between, to, and/or from a cache may be encrypted. In one or more embodiments, portions of L3 cache may be partitioned to prevent data leakage. In one or more embodiments, allocating a dedicated processor core 110 to each virtual environment may allow for decreased chances for cache side channel attacks.

With continued reference to FIG. 1, computing device 104 may be configured to instantiate hypervisor 152 wherein hypervisor 152 is configured to allocate dedicated private memory space 148, allocate dedicated primary memory space, assign more one or more processors 108 core and the like to virtual machine 118. In one or more embodiments, virtual environment 144 may be created on virtual machine 118 wherein a guest operating system may exist separate and independent from host operating system 132. In one or more embodiments, a virtual template may be used to configure virtual machine 118 and create virtual environment 144 for software container 116. "Virtual template" for the purposes of this disclosure is a list of instructions or code that are configured to automate the creation of a particular virtual environment 144. For example, and without limitation virtual template may contain code configuring computing device 104 to create a virtual machine 118 having dedicated private memory space 148, dedicated primary memory space and/or one or more dedicated processor cores 110, wherein a virtual environment 144 may be created on the virtual machine 118. In one or more embodiments, virtual template may include a single executable file that is configured to allocate physical hardware resources for a virtual machine 118 and initialize a virtual environment 144. In one or more embodiments, virtual template May include predefined resource requirements, such as but not limited, predefined amount of dedicated private static memory space 148, predefined amount of processor cores 110, predefined amount of dedicate primary memory space, predefined guest operating system and the like. In one or more embodiments, hypervisor 152 in host operating system 132 may contain command line tools that allow for automating a process in which a virtual environment 144 is created. In one or more embodiments, virtual template may contain instructions in a particular order, wherein a hypervisor 152 may first be instantiated or installed (with predefined settings), the virtual machine 118 is created, resources are allocated for the virtual machine 118, guest operating system is installed on virtual machine 118 to create virtual environment 144 and/or software container 116 is deployed within virtual environment 144. In one or more embodiments, computing device 104 may utilize a script status list to determine if each line of code or instructions were properly executed. "Script status list" for the purposes of this disclosure is information indicating if a proper line of code or instructions within virtual template was properly executed. In one or more embodiments, script status list may return a '0' in instances where the code was properly executed. In one or more embodiments, computing device 104 may be configured to cease execution of following instructions and/or code in instances in which a set of code or instructions had not been properly executed. In one or more embodiments, ceasing execution of virtual script may indicate that a virtual environment 144 may not be stable, and as a result, software module 120 may not be properly executed within virtual environment 144. In one or more embodiments, virtual template may be created using hypervisor 152. In one or more embodiments, virtual template may allow for preconfigured parameters for a virtual environment 144. In one or more embodiments, virtual template may allow for creation of a virtual environment 144 that is exclusive for software container 116. In one or more embodiments, creation of virtual template may allow for removal of unwanted software components that will not be utilized by software module 120. In one or more embodiments, creation of virtual template may allow for creation of a lightweight operating system that contains only the software components that will facilitate the execution of software module 120 and/or software container 116. In one or more embodiments, creation of a lightweight operating system may allow for increased resource allocation wherein guest operating system may utilize less resources such as memory, processing power and the like.

With continued reference to FIG. 1, computing device 104 may be configured to execute software module 120 within virtual environment 144. In one or more embodiments, execution of software module 120 may include the use of container runtime wherein container runtime may manage dependencies such as dedicated software packages 124. In one or more embodiments, container runtime may be configured to ensure that dependencies of software module 120 are taken exclusively from within software container 116 and not form the surrounding operating system and/or virtual environment 144. In one or more embodiments, software module 120 may be executed upon selection of software container 116 within virtual environment 144 by user. In one or more embodiments, selection may include any interaction using one or more input devices as described in this disclosure, such as but not limited to, the clicking of a mouse, the clicking of a keyboard button, and the like. In one or more embodiments, virtual template may include instructions to deploy software module 120 upon creation of virtual environment 144.

With continued reference to FIG. 1, in one more embodiments, computing device 104 may initially receive software module 120 and generate software container 116 as a function of software module 120. In one or more embodiments, computing device 104 may be configured to receive at least a software module 120 and generate virtual environment for software module 120. In one or more embodiments, computing device 104 and/or multi-core processor 108 may create a separate virtual environment 144 for the at least a software module 120, wherein creating the virtual environment further includes generating virtualization layer 160 and allocating dedicated private static memory space 148 through the virtualization layer 160, wherein the separate virtual environment 144 includes a dedicated operating system. In one or more embodiments, computing device 104 may be configured to integrate the at least a software module 120 into the virtual environment 144 by instantiating, the software module 120 into at least one software container 116, wherein the at least one software container 116 includes a plurality of dedicated software packages 124. In one or more embodiments, computing device 104 may then be configured to execute the software module on each software container for each virtual environment 144. In one or more embodiments, processor 108 may be configured to integrate software module 120 into virtual environment 144 using a pre-defined operational rule by instantiating software module into software container 116, wherein the at least software container may contain a non-preemptible container runtime. In some cases, software module 120 may interact with other components via one or more interfaces (e.g., APIs). In an embodiment, software module may be designed to be reusable and to provide certain functionality that may be integrated into one or more different operating systems or larger software applications. In a non-limiting example, at least one operational rule may include a series of rules or polices that dictate how software module 120 interacts with the system and/or the users, this may include, without limitation, utilize computational resources, how it is executed, and/or the like. In a non-limiting example, in a software critical operating environment (SCOE), such as avionics system as described herein, at least one operational rule may ensure that software module 120 does not interfere with any operation of other system components e.g., partitions within virtual environment 144, that software module 120 may uses dedicated system resources e.g., dedicated private static memory space 148, or one or more other functionalities or services provided by other partitions within virtual environments 144 in a way that does not degrade system performance, and that software module 144 may run.

With continued reference to FIG. 1, software container 116 may include code, runtime, system tools, system libraries, configurations, and/or the like. In some cases, software container 116 may provide a "second layer" of isolation or protection from virtual environment 144 and other containers and/or partitions. In one or more embodiments, software container 116 may include a standard unit of software that packages up code and all its dependencies such that integrated software module 120 may run under a desired performance from one operating environment and/or operating system to another. In some cases, software container 116 may be created based on a software image as described above. In a non-limiting example, a first partition may include a container manager wherein the "container manager," for the purpose of this disclosure, is a component used to manage and/or orchestrate a plurality of containers. In some cases, each virtual environment 144 include a containerized application environment. In some cases, container manager may be configured to create and further deploy one or more containers within virtual environment. In some cases, plurality of software containers 116 may be run simultaneously. In an embodiment, container manager may include an engine that provide at least an operating system e.g., CentOS, Debian, Fedora, RHEL, Ubuntu, Windows, MacOS, and/or the like, wherein the engine may enable one or more software containers 116 to run in any partition or virtual environment 144 consistently. In some cases, container manager may also be configured to validate the authenticity of software images, load container executables into container environments, connect container environments to operating service, and exports management APIs to other system management tools. In some cases, each partition may include a container manager, and plurality of container managers of plurality of partitions may be (indirectly) communicative each other. In some cases, container manager at second may be known as "container agent." In a non-limiting example, software image may become a container at runtime-when it is running on the container agent.

With continued reference to FIG. 1, a "non-preemptible container runtime," as described herein, is a runtime that once at least one software container 116 is up and running, it cannot be interrupted or preempted by another processor. In cases where at least one software container 116 is running at RTOS, certain level of service or response time may be guaranteed. In a non-limiting example, at least one software container 116 may be granted access to processor 108, memory 112, and other resources as described above according to partition policy based its priority, and once software module 120 is running, it may have exclusive access to dedicated resources until it completes execution. In a non-limiting example, at least one operational rule of software module 120 and/or software container 116 may be specific one or more safety-critical tasks which must not be delayed or interrupted by other non-critical tasks running on other partitions. Exemplary embodiments of software container 116 may include a DOCKER container (that encapsulate any payload and dependencies into a single object", RTOS container, safety-certified container (designed to meet stringent certification requirements of regulatory bodies such as, without limitation, FAA or EASA), among others. In a non-limiting example, software container 124 may capture a flight management software (FMS) module, wherein the FMS module may be configured to perform critical functions related to navigation and flight planning defined by its operational rule. Such FMS module may be instantiated within a software container 124 and run with a non-preemptible runtime to ensure that navigation calculations and related data processing are not interrupted to maintain safety of flight operations.

With continued reference to FIG. 1, in one or more embodiments, instantiating software module 120 into software container 116 may include extracting software metadata from software image, wherein the software metadata may include a plurality of software configuration parameters and a plurality of digital files. As used in this disclosure, "software metadata" is information related to software module. In a non-limiting example, software metadata may include a manifest file specifying software version number, required dependencies, configurations and/or the like. In one or more embodiments, software metadata may include or be included within software data 136. As described herein, "software configuration parameters" are parameters that dictate how software module 124 should be set up within a particular standard operating environment (SOE). Exemplary software configuration parameters may include, without limitation, one or more environment variables, service endpoints, port numbers, paths to necessary libraries or dependencies, and/or other configuration data necessary for software module 120 to run correctly within virtual environment 144. In some cases, processor 108 may configure container manager within host operating system 132 through virtualization layer 160 to initialize at least one software container 116 within virtual environment 144 as a function of plurality of software configuration parameters by preparing container environment i.e., non-preemptible container runtime based on one or more software configuration parameters. This may be done, for example, by setting up correct file paths, configuring virtual network settings, installing required libraries, and/or the like based on plurality of software configuration parameters. Integrating software module 120 may further include deploying plurality of digital files and/or dedicated software packages within the initialized software container. As used in this disclosure, "digital files" are a set of files each containing at least a portion of at least one operational rule. In some cases, plurality of digital files may include any files that necessary for the operation of integrated software module 120, for example, and without limitations, plurality of digital files may include one or more executable files, libraries, scripts, certificates for securities, data files, and/or the like. Container manager may place plurality of digital files and/or dedicated software packages 124 in correct directories, setting permission, prepare container agent to execute plurality of digital files. In some cases, container agent may load at least one operational rule into non-preemptible container runtime. In a non-limiting example, at least one operational rule may govern how software module 120 operates within software container 120 and virtual environment e.g., interaction with other software applications, utilization of dedicated resources, response to certain events, among others.

With continued reference to FIG. 1, virtual environment 144 may be created as a function of a configuration request. As used in this disclosure, a "configuration request" is a structured set of data or a command to provide a specific operational environment or resources. In some cases, configuration request may be sent by a software entity as described below or component such as, without limitation, host operating system 132 and/or a separate virtual environment 144, asking another entity such as, without limitation, hypervisor 112 to establish, modify, or provide a desired SOE. In a non-limiting example, host operating system 132 may include a management VM configured to monitor, manage, and/or administer overall operations and resources within virtual environment 144. In a non-limiting example, host operating system may include, or at least interface with one or more health monitors, system health management PSSS, aircraft system monitoring PCS, operational mode management PCS, and/or the like. In one or more embodiments, virtual environment may be created as function of a partition policy as described above. In one or more embodiments, allocating a dedicated private static memory space through the virtualization layer may include allocating a dedicated private static memory space as a function of a configuration request. In one or more embodiments, configuration request may contain various resource requirements, such as but not limited to memory, processing power and the like. In one or more embodiments configuration request may indicate a particular dedicated private static memory space 148 that may be required. In one or more embodiments, configuration request may be created as a function of software data 136 wherein required sources within software data may be used to generate configuration request.

With continued reference to FIG. 1, in one or more embodiments, creation of virtual environment 144 may allow for predictable results wherein each iteration may contain the same resource requirements, the same code and the like. In one or more embodiments, virtual environment 144 may be modified following each iteration wherein software components that are not used by software container 116 may be removed to allow for increased resource allocation for software container 116. In one or more embodiments, following each iteration the amount of dedicated primary memory space, dedicated processor cores 110 and/or dedicated private static memory space may change based on resources used in a previous iteration. In one or more embodiments, virtual template may allow for predictable results amongst one or more differing computing devices. In one or more embodiments, virtual template may allow for cloning of a virtual environment 144 containing software container 116, wherein a second virtual template, cloned by virtual template may be used by another individual for similar uses.

With continued reference to FIG. 1, virtual template may include and/or be included within a single executable file. In one or more embodiments, the single executable file may initialize hypervisor 152, create virtual machine 118, allocate resources to the virtual machine 118, install guest operating system on the virtual machine 118 to create virtual environment 144, deploy software container 116 in the virtual machine 118 and within virtual environment 144, install container runtime within virtual environment 144 and/or deploy software container 116 within virtual environment 144. In one or more embodiments, a virtual template may contain a single executable file wherein selection of the single executable file may create virtual machine 118 and deploy software container 116 within virtual environment 144. In one or more embodiments, a plurality of virtual templates may exist wherein selection of each template may cause creation of a particular virtual environment 144 that is exclusively created for a particular software container 116. In one or more embodiments, each of a plurality of software containers 116 may be associated with a particular virtual template. In one or more embodiments, selection of the virtual template may be associated with initialization of a particular software container 116.

With continued reference to FIG. 1, virtual template may include and/or be included in an install script file. "Install script file" for the purposes of this disclosure is an automated script in which one or more processes may occur after installation of a software. For example, and without limitation, install script file may be configured to deploy software container 116 after execution of virtual machine 118 and virtual environment 144. In one or more embodiments, install script file may be generated using an installer on a host operating system 132. In one or more embodiments, installing script file may allow for execution and initiation of multiple software in a single script. For example, and without limitation, installing script file may allow for initialization of hypervisor 152, creation of virtual machine 118, and deployment of software container 116 within virtual machine 118. In one or more embodiments, virtual template may contain a single executable file containing software container 116, virtual environment 144, container runtime, and/or any other data as described in this disclosure that may be used for generation of virtual environment 144 and deployment of software container 116. In one or more embodiments, single executable file may allow for an automated process in which a virtual machine 118 may be created for software module 120. In one or more embodiments, single executable file may allow for decreased risk of human error in the generation of virtual machines 118 and virtual environments 144. In one or more embodiments, virtual template may allow for repeatability and dependency of software module 120 within virtual environment 144.

With continued reference to FIG. 1, in one or more embodiments, hypervisor 152 may include type 1 hypervisor 152 wherein the type 1 hypervisor 152 creates virtualization layer 160 above one or more physical hardware components of computing device 104. In one or more embodiments, virtual template may be configured to interact with hypervisor 152's management tools and/or application program interface. In one or more embodiments, virtual template may interact with hypervisor 152 wherein virtual machine 118 may be created on type 1 hypervisor 152. In one or more embodiments, virtual template may automate the virtual machine 118 making process wherein virtual template may create virtual machine 118 and generate virtual environment 144 containing software container 116 and/or software module 120.

With continued reference to FIG. 1, in one or more embodiments, virtual machine 118 may contain virtual environment 144 wherein software container 116 and/or software module 120 is executed within virtual environment 144. In one or more embodiments, following execution and creation of virtual machine 118, virtual environment 144 and/or software container 116, virtual machine 118 may be packaged for future use. In one or more embodiments, virtual machine 118 may be packaged to include virtual environment 144 and/or any information contained within virtual environments 144, such as but not limited to, software container 116 and data produced by software container 116. In one or more embodiments, hypervisor 152 may allow for generation of a virtual package. "Virtual package" for the purposes of this disclosure is a virtual machine 118, containing a generated environment including information within the virtual environment 144. For example, and without limitation "Virtual package" may include virtual machine 118, having information indicating dedicated private static memory space 148, dedicated processor cores 110, dedicated primary memory space and the like. In one or more embodiments, virtual package may include virtual machine 118 that has been created for initialization and/or deployment of software container 116. In one or more embodiments, virtual package may contain open virtualization format (OVF), virtual hard disk (VHD) and/or any other format that may allow for portability of virtual machine 118 wherein virtual package may be instantiated on more than one computing devices. In one or more embodiments, virtual package may include an already installed operating system containing software module 120. In one or more embodiments, upon termination of use of software module 120, virtual machine 118 may be saved in an OVF format wherein virtual machine 118 may be instantiated on differing devices. In one or more embodiments, hypervisor 152 may contain one or more features configured to allow for export of virtual machine 118 and/or a cloning of virtual machine 118 wherein virtual machine 118 and all of its components may be packaged into a single file. In one or more embodiments, virtual package may be deployed one or more computing devices. In one or more embodiments, virtual package contain an OVF format wherein virtual package may be deployed on a type 1 hypervisor 152 and/or type 2 hypervisor 152. In one or more embodiments, virtual package may include virtual machine 118 metadata wherein virtual machine 118 metadata may include information such as but not limited to, virtual hardware (e.g. dedicated private static memory space 148, dedicate processor 108, etc.), various virtual machine 118 settings and the like. In one or more embodiments, virtual package may be generated as a function of virtual template wherein virtual template may create virtual machine 118, generate virtual environment 144 and deploy software container 116 and wherein the virtual machine 118 may be packaged as a virtual package. In one or more embodiments, virtual package may allow for portability of software module 120 wherein any computing device 104 containing hypervisor 152 may be used to execute virtual package. In one or more embodiments, virtual package may be cloned for use on one or more computing devise. In one or more embodiments, virtual package may serve as an operating system configured solely for software container 116. In one or more embodiments, virtual package may be deployed on type 1 hypervisor 152 and/or type 2 hypervisor 152 depending on the importance and safety of software module 120.

With continued reference to FIG. 1, in one or more embodiments, virtual package may be generated on host operating system 132. In one or more embodiments, type 2 hypervisor 152 may exist on host operating system 132 wherein virtual template may be configured to generate virtual package using type 2 hypervisor 152. In one or more embodiments, virtual package may then be saved in an OVF format and used in in the future with type 1 hypervisor 152. In one or more embodiments, virtual package may include various network settings, various security setting, various data saved on virtual machine 118 and the like. In one or more embodiments, virtual package may be continuously modified and/or updated. In one or more embodiments, virtual package may allow for interaction of software module 120, wherein data generated from software module 120 and/or modifications made to software module 120 may be saved for future iterations. In one or more embodiments, virtual package may be imported into more than one hypervisor 152s. In one or more embodiments, virtual package may allow for portability of software module 120, wherein software module 120 and/or any generated data may be executed on any machine containing hypervisor 152. In one or more embodiments, computing device 104 may contain a plurality of virtual packages, wherein each virtual package may contain a separate virtual machine 118 virtual environment 144 and/or software container 116. In one or more embodiments, selection of one or more virtual packages may allow for execution of one or more virtual environments 144. In one or more embodiments, virtual package may allow for repeatability and reliability of software module 120. In one or more embodiments, virtual package may be placed on a portable hard storage device, transmitted to a database and the like for future access.

With continued reference to FIG. 1, In one or more embodiments, software container 116, virtual template and/or virtual package may include a reusable software component (RSC). "Reusable software component" for the purposes of this disclosure is a software that has been pre-tested and has been certified to be used multiple times and on multiple systems. For example, and without limitation, software container 116 may include RSC wherein software container 116 may be reused on differing operating systems and has been tested multiple times. In one or more embodiments, an RSC may allow for efficiency and consistency wherein software that has been proven to work may be duplicated and/or used on multiple differing systems and/or operating systems. In one or more embodiments, a piece of software may be created as an independent component and then labeled as an RSC following testing of the software. In one or more embodiments, RSC may include a software that has been tested by various aviation and/or military authorities and has been validated and/or certified for reuse. In one or more embodiments, a unit of software can be developed initially as an independent component. Software units developed as independent software components specifically for reuse and then airworthiness qualified as part of a system 100 can be endorsed by the cognizant airworthiness authority as reusable for subsequent systems. The scenarios for reuse may dictate the amount of credit that will be allowed by the airworthiness authority. Any of the software life cycle artifacts (such as requirements specifications, design documents, test reports, source code, or any other life cycle artifacts supporting software qualification), can be developed for reuse, if those artifacts are initially developed specifically for the software unit separate from the artifacts for the initial system 100 the software unit and/or software module 120 is first qualified with. Purchase of software "off the shelf" does not necessarily mean that software carries any airworthiness pedigree, nor does it infer that the proper documentation for reuse exists. Some do, and these do offer documentation, so this characterization of software overlaps that of the RSC. In one or more embodiments, software container 116, virtual template and/or virtual package may be certified for reuse, wherein software container 116, virtual template and/or virtual package may be relied upon to perform the same functions with the same reliability and consistency in every iteration.

With continued reference to FIG. 1, in one or more embodiments, virtual machine 118 and/or virtual environment 144 may exist wherein virtual environment 144 may contain an operating system ready to deploy software container 116. In one or more embodiments, an already existing virtual machine 118 and/or virtual machine 118 may be contained within virtual package wherein virtual package contains virtual environment 144 having solely an operating system. In one or more embodiments, software container 116 may be deployed to virtual environment 144 wherein virtual package may be instantiated and software container 116 may be deployed to virtual environment 144. In one or more embodiments, virtual packages containing virtual machines 118 and virtual environments 144 for each software container 116 may cause increased storage usage and decreased portability. In one or more embodiments, one or more virtual packages may be created, wherein each virtual package contains virtual machine 118 with predefined resources allocated and an already generated virtual environment 144. In one or more embodiments, one or more virtual package may be instantiated wherein one or more software containers 116 may be deployed within virtual environment 144. In one or more embodiments, software container 116 may be deployed on virtual environment 144. In one or more embodiments, following termination of software module 120 within virtual environment 144, software container 116 may be removed. In one or more embodiments, software container 116 may allow for containment of software module 120 wherein software container 116 does not rely on the operating system within virtual environment 144. In one or more embodiments, upon termination of software module 120, data generated within software module 120 may be contained within software container 116. In one or more embodiments, virtual package may include a bare operating system in which software container 116 may not affect various systems and settings on the operating system. In one or more embodiments, a user may select from a plurality of preconfigured virtual packages wherein, each preconfigured virtual package may contain a pre-installed operating system, pre-installed container runtime, reconfigured resources allocated and the like. In one or more embodiments, plurality of virtual packages may allow for differing virtual environments 144 that suited to differing software containers 116. For example, and without limitation, a first virtual package may contain 2 gigabytes of allocated resources, whereas a second virtual environment 144 may contain 4 gigabytes of allocated resources. In one or more embodiments, system 100 may include a virtual machine 118 container. "Virtual machine container" for the purposes of this disclosure is a preconfigured machine having a preconfigured operating system installed. In one or more embodiments, virtual machine 118 container may be compared to a newly installed operating system wherein the operating system on a computing device 104. In one or more embodiments, virtual machine 118 container may be configured to deploy software containers 116 in a separate environment from the host operating system 132. In one or more embodiments, software containers 116 deployed within virtual machine 118 container may not affect systems, settings and the like within virtual machine 118 container, wherein virtual machine 118 container may be used for a plurality of software containers 116. In one or more embodiments, virtual machine 118 container may be cloned to allow for multiple software containers 116 to be deployed within multiple virtual machine 118 containers. In one or more embodiments, virtual machine 118 containers may contain operating systems in which software, data and/or settings remain consistent and unchanged allowing for increased repeatability. In one or more embodiments, virtual machine 118 container may contain an OVF format and be used similarly to virtual package.

With continued reference to FIG. 1, in one or more embodiments, virtual package and/or virtual container may be instantiated directly on hypervisor 152. In one or more embodiments, host operating system 132 may exist on computing device 104, wherein virtual package and/or virtual container may be instantiated through host operating system 132. In one or more embodiments, virtual package and/or virtual container running atop type 1 hypervisor 152 may be accessed through remote software such as but not limited to remote desktop software, a console such as a hypervisor 152 console, a secure shell (SSH), A virtual network software (VNC) and the like. In one or more embodiments, one or more virtual machines 118 may be accessed from host operating system 132 while still allowing for the virtual machines 118 to run atop type 1 hypervisor 152. In one or more embodiments, remote software may allow for initialization of a virtual environment 144 through host operating system 132. In one or more embodiments, remote software may allow for independence between host operating system 132 and virtual environment 144 while still allowing for access to virtual environment 144. In one or more embodiments, remote software may allow for access to multiple virtual environments 144 wherein multiple virtual environments 144 may be displayed on a single display device.

With continued reference to FIG. 1, software container 116, virtual template, virtual package and/or virtual container (which collectively be known henceforth as "application programs") may be encrypted, password protected, digitally signed and the like to preserve the trustworthiness and/or the integrity of software programs. In an embodiment, methods and systems described herein may perform or implement one or more aspects of a cryptographic system 100. In one embodiment, a cryptographic system 100 is a system 100 that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system 100 may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system 100 wishes to be able to decrypt the ciphertext. One example of a symmetric cryptographic system 100 is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system 100," in which possession of the encryption key does not make it practically feasible to deduce the decryption key, so that the encryption key may safely be made available to the public. An example of a public key cryptographic system 100 is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system 100 is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system 100, a prover runs a proving algorithm using the proving key and secret information available to the prover, and a verifier checks the proof using the verification key; public key cryptographic system 100 may include RSA, elliptic curve cryptography, ElGamal, or any other suitable public key cryptographic system 100. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system 100 or using a private key of a symmetric cryptographic system 100; for instance, trusted party may verify response by decrypting an encryption of challenge or of another datum using either a symmetric or public-key cryptographic system 100, verifying that a stored key matches the key used for encryption as a function of at least a device-specific secret. Keys may be generated by random variation in selection of prime numbers, for instance for the purposes of a cryptographic system 100 such as RSA that relies prime factoring difficulty. Keys may be generated by randomized selection of parameters for a seed in a cryptographic system 100, such as elliptic curve cryptography, which is generated from a seed. Keys may be used to generate exponents for a cryptographic system 100 such as Diffie-Helman or ElGamal that are based on the discrete logarithm problem.

Keys may be generated by random variation in selection of prime numbers, for instance for the purposes of a cryptographic system 100 such as secret that relies prime factoring difficulty. Keys may be generated by randomized selection of parameters for a seed in a cryptographic system 100, such as elliptic curve cryptography, which is generated from a seed. Keys may be used to generate exponents for a cryptographic system 100 such as Diffie-Helman or ElGamal that are based on the discrete logarithm problem.

Cryptographic system 100 may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

An "attested boot" for the purposes of this disclosure is system that verifies the reliability of a boot sequence to ensure that an operating system and its own components have not been tampered with. In one or embodiments, computing device 104 may check various digital signatures associated with the kernel, bootloader, operating system and the like to ensure that a virtual machine and/or operating system has not been tampered with or compromised. In one or more embodiments, a system such as computing device may refuse to boot the underlying software of the software cannot be verified. In one or more embodiments, computing device 104 and/or hypervisor 152 may be configured to verify a compliance of the software module with a plurality of pre-determined safety standards sourced from a trusted repository by monitoring an adherence of the software module to a pre-defined operational rule within a non-preemptible container runtime. As used in this disclosure, a "compliance" is a data element measuring a conformance of software module to established guidelines or specifications designed to ensure the safety and reliability of software module (especially within environment where failure may lead to significant harm or loss) known as "safety standards." In some cases, compliance may include a quantitative value such as a score or a range of scores. In other cases, compliance may include one or more binary representation, for example, "1" and "0" or "TRUE" and "FALSE," wherein "1/TRUE" may indicate software module is compliant with at least one corresponding safety standard and "O/FALSE" may indicate software module is non-compliant with the at least one corresponding safety standard. A "trusted repository," for the purpose of this disclosure, is a trust entity e.g., a secure storage or even a trusted (third) partition, wherein plurality of safety standards are kept. In a non-limiting example, trust repository may be considered authoritative and tamper-proof e.g., one or more secure databases, version control systems, and/or certified data centers. In an embodiment, computing device 104 may be configured to evaluate compliance to ensure that software module may perform all functions specified to at least one operational rule. In a non-limiting example, computing device 104 may be configured to determine a design assurance level classification (DAL) associated with software module design assurance level classification (DAL) based on container runtime behaviors observed by container agent or a record generated and managed by logging mechanism 146 (in real-time or near real-time). In one or more embodiments, hypervisor 152 may measure various data such as software module, software container and the like wherein changes to data size and the like may indicate that a software may have been compromised. In one or more embodiments, inputs and/or outputs of software module may be digitally signed wherein data not containing a digital signature may indicate that software module may be compromised. In one or more embodiments, virtual machine 140 and/or data within virtual machine may be digitally signed wherein an absence of a digital signature may indicate that the system has been compromised.

A "digital signature," as used herein, includes a secure proof of possession of a secret by a signing device, as performed on provided element of data, known as a "message." A message may include an encrypted mathematical representation of a file or other set of data using the private key of a public key cryptographic system 100. Secure proof may include any form of secure proof as described above, including without limitation encryption using a private key of a public key cryptographic system 100 as described above. Signature may be verified using a verification datum suitable for verification of a secure proof; for instance, where secure proof is enacted by encrypting message using a private key of a public key cryptographic system 100, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system 100. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, software programs may include a time-varying software programs, which may have a time limit after which time-varying software programs is no longer valid. Time limit may be calculated from an initial time, which may be a datum linked to a particular timestamp or other value representing a fixed moment in time, associated with time-varying software programs; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using software programs. Additional data may include one or more additional data, including [data], that are [received/generated/identified/determined] by processor 108 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. [data], along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, [data store] or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 1, additionally, or alternatively, software programs may be encrypted, by host operating system 132 acting on a first partition prior to the transmission. In one or more embodiment, host operating system 132 may implement one or more aspects of a cryptographic system 100, wherein the cryptographic is a system 100 that converts data e.g., software programs, from a first form, known as "plaintext," which is intelligible when viewed in its intended format, into a second form, known as "ciphertext," which is not intelligible when viewed in the same way. In some cases, software programs may be unintelligible in any format unless first converted back to plaintext. Such process of converting plaintext into ciphertext is known as "encryption." In some cases, encrypting software programs may include the use of a datum, such as an "encryption key," to alter plaintext software programs. In some cases, at least a processor 108 (and host operating system 132) may convert ciphertext back into plaintext, which is a process known as "decryption." At least a processor 108 may be configured to decrypt software programs upon receipt. Decrypting software programs may include the use of another datum, such as a "decryption key," to return the ciphertext to original plaintext form. In some embodiments, cryptographic system 100 implemented by host operating system 132 may include a "symmetric cryptographic system 100," wherein the decryption key may be essentially the same as encryption key. In a non-limiting example, possession of either key may make it possible to deduce the other key quickly without further secret knowledge. In some cases, encryption and decryption keys in symmetric cryptographic systems may be kept secret and shared only with trusted entities such as, without limitation, trusted partitions and/or at least a processor 108. In a non-limiting example, host operating system 132 may include an Advanced Encryption Standard ("AES"), which arranges software programs into matrices and then modifies the matrices through repeated permutations and arithmetic operations with an encryption key.

With continued reference to FIG. 1, in some cases, host operating system 132 may include an asymmetric cryptographic system 100, wherein either encryption or decryption key cannot be readily deduced without additional secret knowledge, even given the possession of a corresponding decryption or encryption key, respectively. In a non-limiting example, host operating system 132 may implement a "public key cryptographic system 100," in which possession of the encryption key does not make it practically feasible to deduce the decryption key, so that the encryption key may safely be made available to the public e.g., all partitions within virtual environment 144. In some cases, public key cryptographic system 100 may include RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. In some cases, host operating system 132 may employ an elliptic curve cryptography, wherein the elliptic curve cryptography may rely on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some cases, software programs may be configured to initiate an encrypted handshake between two partitions or between a partition and an external system 100, wherein such handshake may involve an exchange of one or more encrypted messages to verify the identity of parties involved. In a non-limiting example, host operating system 132 108a may send software programs to at least a processor 108 to initiate a secure connection with a second partition as described in detail below using transport layer security (TLS) protocol, wherein both partitions prove their identities to each other using encrypted keys. In some cases, software programs may specify that data stored or transmitted by one or more partitions should be encrypted using AES as described above. In a non-limiting example, software programs may dictate that any data saved to disk by one or more partition must be encrypted with AES-256 key. Only parties with the decryption key may transform the ciphertext back into plaintext when reads. In some cases, when two different keys are involved, one or more partitions may use private keys to decrypt messages encrypted with corresponding public keys.

With continued reference to FIG. 1, in one or more embodiments, at least a processor 108 may be configured to verify the integrity of data or to ensure that software programs hasn't been tampered with using cryptographic hashes, also referred to by the equivalent shorthand term "hashes." A cryptographic hash, as used herein, is a mathematical representation of data, such as software programs and data thereof, wherein the mathematical representation is produced by a lossy "one-way" algorithm known as a "hashing algorithm." In some cases, hashing algorithm may be a repeatable process; that is, identical data may produce identical hashes each time they are subjected to a particular hashing algorithm. Since hashing algorithm is a one-way function, it may be impossible to reconstruct a lot of data from a hash produced from the lot of data using the hashing algorithm. In some cases, hashing algorithm may include one or more processes that reconstruct the full data from the corresponding hash using a partial set of data from the full data may be possible only by repeatedly guessing at the remaining data and repeating the hashing algorithm; it is thus computationally difficult if not infeasible for a single computer to produce the data, as the statistical likelihood of correctly guessing the missing data may be extremely low. In a non-limiting example, when software programs is sent, a SHA-256 hash of the request may be generated and sent alongside. At least a processor 108 or receiving partition may hash the received configuration request using the same algorithm and check if the hashes match to verify the data integrity.

With continued reference to FIG. 1, processor 108 may be configured to display each virtual environment 144 on a single display screen 172. "Display Screen" for the purposes of this disclosure is a device configured to show visual information. In some cases, display screen 172 may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display screen may include a separate device that includes a transparent screen configured to display computer generated images and/or information. In some cases, display screen 172 may be configured to visually present one or more data through a graphical user interface to a user, wherein a user may interact with the data through the graphical user interface. In one or more embodiments, one or more virtual environments 144 may be projected simultaneously on display screen 172. In one or more embodiments, each portion of display screen 172 may visually display virtual environment 144, wherein multiple virtual environments 144 may exist on a singular display screen 172. In one or more embodiments, each virtual environment 144 may be accessed through one or more remote software as described above, wherein the remote software may display virtual environment 144. In one or more embodiments, remote software may allow for display of multiple virtual environments 144 on single display screen 172. In one or more embodiments, virtual environments 144 may be running simultaneously on hypervisor 152. In one or more embodiments, host operating system 132 and virtual environments 144 may exist on hypervisor 152 wherein host operating system 132 and virtual environments 144 may be performing different processes and/or actions. In one or more embodiments, hypervisor 152 may include one or more remote software that may allow for access to one or more virtual environments 144 on single display screen 172. In one or more embodiments, remote software may allow for visualization of multiple virtual environment 144 on single display screen 172.

With continued reference to FIG. 1, in one or more embodiments, computing device 104 may be configured to initiate a secure boot process when the system 100, in some cases, is powered on or restarted. In some cases, computing device 104 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, computing device 104 may include a plurality of TPMs, each contain an RSA key pair known as "Endorsement key (EK)," wherein the RSA key pair may be maintained inside of a TPM and cannot be accessed by software module 120. In some cases, a first partition may include a bootloader (i.e., the first piece of software that runs). In some cases, bootloader may be verified, for example, one or more system 100 firmware may be configured to check bootloader's digital signature before execution using keys e.g., public keys stored in TPM or another secure component. In case where bootloader's signature doesn't match, computing device 104 may halt, preventing potential malicious partitions from running. Once bootloader is verified and executed, hypervisor 152 may be instantiated as described above. In some cases, hypervisor 152 may also be verified through an associated digital signature to ensure its authenticity. In a non-limiting example, computing device 104 may boot only with trusted and authenticated partitions e.g., a primary partition and plurality of child partitions. Child partitions be verified before loading, or trusted version of second partition may be loaded. Hypervisor may be configured to prevent any child partition that yield a negative response during verification. In some cases, all events during the secure boot process as described herein, including, without limitation, any verification failures or anomalies, can be communicated to primary partition through virtual bus. In some cases, these events may be alerted to certain users e.g., administrators. Additionally, or alternatively, in cases where verification fails, computing device 104 may be configured to boot into a safe mode, attempting to restore a trusted software version, or simply halting at least a processor 108 and/or primary partition to prevent potential threats.

Figure 2:
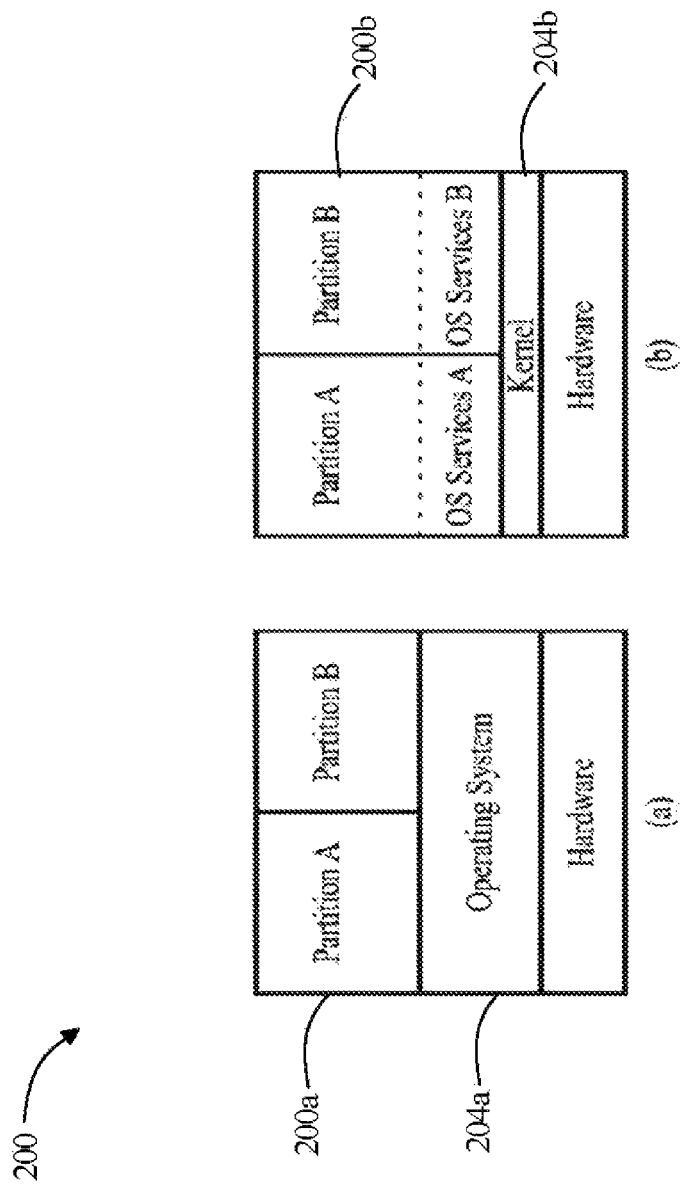
FIG. 2 is an exemplary of system infrastructures.

Referring now to FIG. 2, an exemplary embodiment of one or more system infrastructures 200 is described. 'System infrastructure" for the purposes of this disclosure refers to a structure in which memory and/or storage devices are partitioned for use in virtual machines. In first system infrastructure 200a, an operating system 204a may sit atop the physical hardware of a computing device. In one or more embodiments, the operating system 204a may provide the means to partition and/or allocate memory within the operating system for use in one or more virtual machines. In one or more embodiments, first system infrastructure 200a may allow for a single operating system to manage one or more partitions. In one or more embodiments, virtual machines with first system infrastructure 200a must rely on the dependability of the host operating system 204a. In one or more embodiments, a type 2 hypervisor as described in FIG. 1, may be used to create one or more virtual machines atop the operation system 204a. In second system infrastructure 200b, one or more operating systems may communicate directly with physical hardware. In contrast to first system structure 200a wherein one or more virtual machines must communicate with a host operating system 204a to receive resources, in second system infrastructure 200b, one or more virtual machines may communicate directly with the physical hardware of a computing device. In one or more embodiments, a kernel 204b may allocate resources to each operating system. In one or more embodiments, kernel may create a virtualization layer as described in FIG. 1 to generate virtualized devices and allocate the virtualized devices to each operating system. In one or more embodiments, a partition created within second system infrastructure may be independent of other operating systems operating on the computing device.

Figure 3:
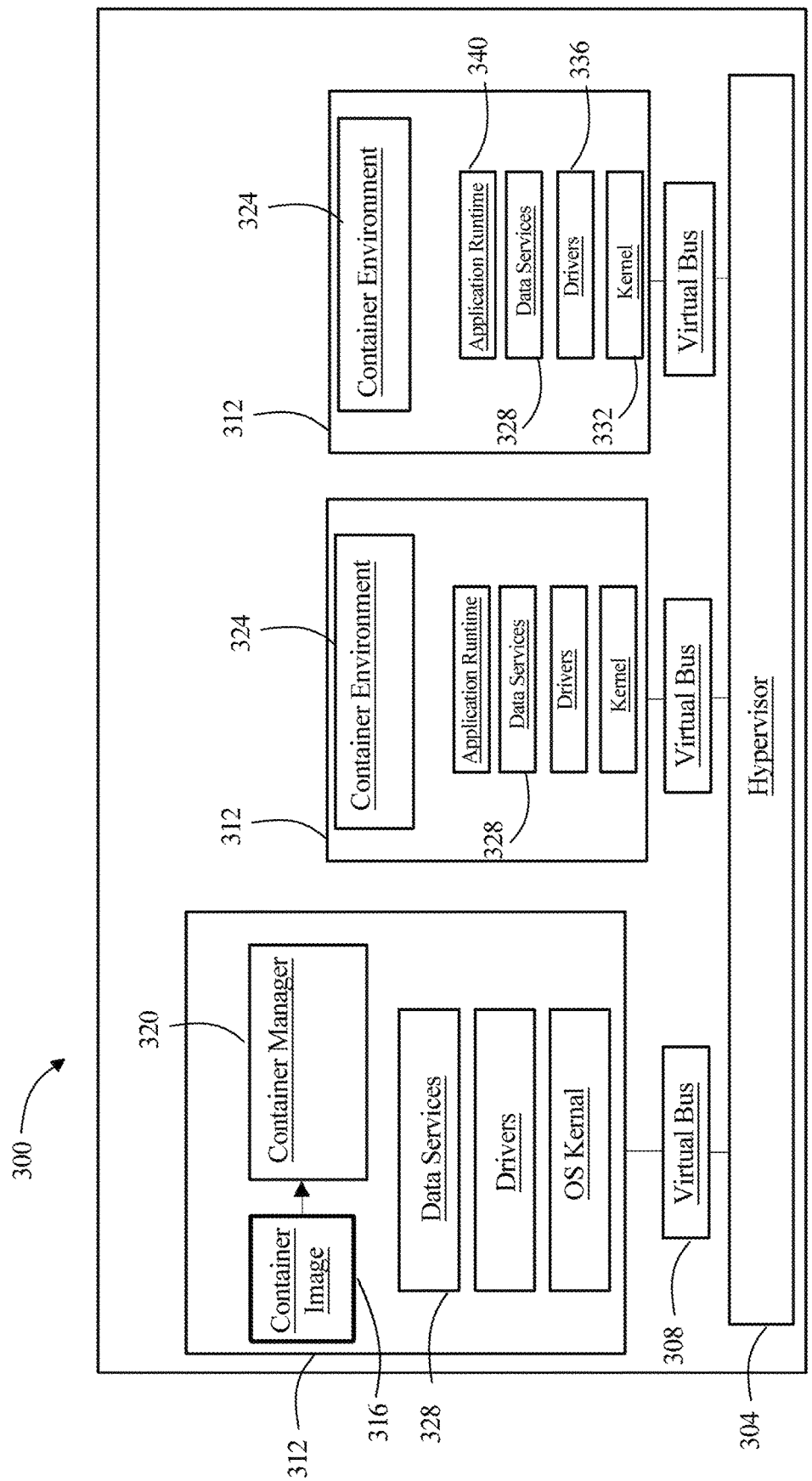
FIG. 3 is an exemplary embodiment of a system for management of one or more virtual machines.

Referring now to FIG. 3, an exemplary embodiment of a system 300 for management of one or more virtual machines is described. In one or more embodiments, system may include a hypervisor 304, wherein the hypervisor 304 may be configured to manage one or more virtual machines. In one or more embodiments, hypervisor may include a type 1 hypervisor 304 wherein the hypervisor sits between the hardware components of the computing device and the virtual machines. In one or more embodiments, hypervisor may create a virtualization layer wherein virtualized bus components 308 are generated for each virtual machine. In one or more embodiments, virtual bus 1308 may be used to allow for communication between a virtual environment 312 and one or more physical hardware devices. In one or more embodiments, a container image 316, such as software container as described above may be deployed within virtual environment 316. In one or more embodiments, virtual environment 312 may contain container management software such as container runtime to allow for proper execution and/or monitoring of container image 316. In one or more embodiments, container image 316 may contain dedicated software packages as described in reference to FIG. 1, wherein the dedicated software packages may contain drivers, dependencies, libraries and the like. In one or more embodiments, a first virtual environment 312 may be utilized to run a container manager 320, whereas other virtual environments may be used for deployed applications and/or software wherein the deployed applications may run within container environments 324. In one or more embodiments, the container manager 320 relies on an agent to observe and perform operations on running containers within each virtual environment 312. The agent may be necessary because the container is no longer controlled by a central operating system process manager, and instead must be data services 328 that are connected. The container runtime agent may be a remote-control interface running within a container to accommodate the distributed architecture of a container deployed in VMs. Because VM containers are no longer controlled by a central operating system, the agents are used to connect to the manager and fulfill manager operations performed over standard VM data interfaces. The container environment is 324 now a VM instead as a process. Namespace controls are no longer needed on the SCOE architecture. Instead, using OS namespace controls, the SCOE uses a hypervisor 304 to isolate the containers in VMs. In one or more embodiments, FIG. 3 illustrates three virtual environments 312 and/or virtual machines each of which can modularly accept some guest software. In this example, one type of guest software is a Guest OS such as Linux which can readily accept deployments of multiple OCI containers. In Linux, and other container manager OSes, containers can be dynamically deployed. Also shown in this example is another type of guest software for which module extraction is performed. In this type of guest, the container has been extracted and integrated with the guest OS prior to deployment. This example illustrates some options for deploying OCI containers to VMs. A prevailing definition of a container is established by the Open Container Initiative (OCI). Containers may include packages of application code coupled together with a list of application dependencies. However, OCI can already list a wide range of dependencies such as APIs, programming language runtimes and operating system libraries required to run software services in an enterprise or cloud environment. While promising, a significant challenge to applying OCI containers in an avionics context today is that containers lack a certifiable partitioning architecture which can robustly contain faults which are relevant to airworthiness and safety. Using assume-guarantee language, containers could be said to assume robust partitioning when they share CPU, memory, storage, network resources, etc., at the operating systems level, rather than guarantee robust partitioning. In one or more embodiments, each container environment may contain their own kernel 332, their own drivers 336 and their own application runtimes 340.

Figure 4:
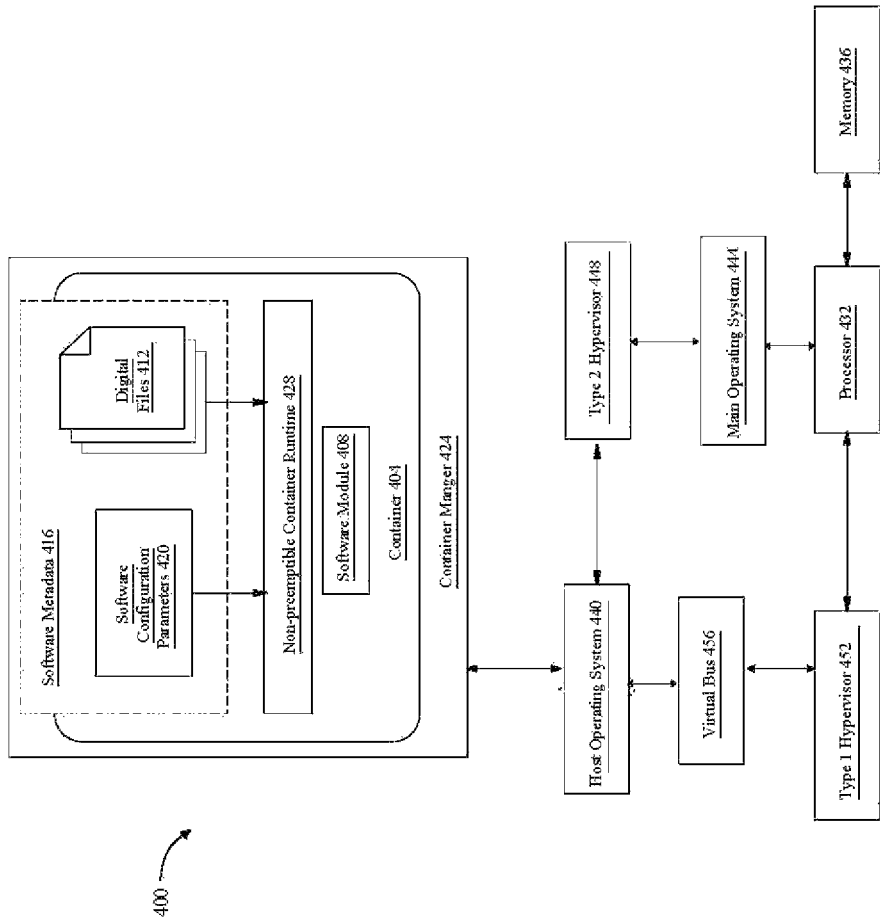
FIG. 4 is a block diagram of a system illustrating a software container in communication with one or more hardware components.

Referring now to FIG. 4, an exemplary embodiments of a system 400 illustrating a container 404 in communication with one or more hardware components is described. Container 404 may include a container such as software container as described in reference to FIG. 1. In an embodiment, a software module 408 may be designed to be reusable and to provide certain functionality that may be integrated into one or more different operating systems or larger software applications. In one or more embodiments, container 404 may allow for software module 408 to be reused on multiple operating systems. In one or more embodiments, container 404 may ensure that any dependencies, libraries and the like needed by software module may be retrieved from within container 404. In one or more embodiments, container may include code, runtime, system tools, system libraries, configurations, and/or the like. In some cases, at least container 404 may provide a "second layer" isolation or protection from a host operating system, environment and other containers and/or partitions. In one or more embodiments, container 4404 may include a standard unit of software that packages up code and all its dependencies such that software module 408 may run under a desired performance from one standard operating environment to another. In one or more embodiments, container contain digital files 412, wherein the digital files 412 contain dependencies, libraries, and/or any other information that may be used to ensure containment of software module 408. In one or more embodiments, instantiating software module 408 into container 404 may include extracting software metadata 416 from software module 408 wherein the software metadata 416 may include a plurality of software configuration parameters 420 and a plurality of digital files 412. As used in this disclosure, "software metadata" is information related to software module 408. In a non-limiting example, software metadata may include a manifest file specifying software version number, required dependencies, configurations and/or the like. As described herein, "software configuration parameters" are parameters that dictate how software module 408 should be set up within a particular SOE. Exemplary software configuration parameters 420 may include, without limitation, one or more environment variables, service endpoints, port numbers, paths to necessary libraries or dependencies, and/or other configuration data necessary for software module 408 to operate in any virtual environment. In one or more embodiments, a container manager 424 may manage execution of container. In one or more embodiments, container manager 424 may be configured to manage container and ensure that software module 408 operates in an isolated environments. This may be done, for example, by setting up correct file paths, configuring virtual network settings, installing required libraries, and/or the like based on plurality of software configuration parameters 416. Integrating software module 408 may further include deploying plurality of digital files 412 within the initialized container 404. Container manager 424 may place plurality of digital files 412 in correct directories, setting permission, prepare container agent to execute plurality of digital files. In some cases, container agent may load at least one operational rule 122 into non-preemptible container runtime 428, such as a non-preemptible runtime as described above. In cases where container 404 is running at RTOS, certain level of service or response time may be guaranteed. In one or more embodiments, in instances in which container 404 contains a contain-runtime a container manager may not be needed. In a non-limiting example, at least one container 404 may be granted access to at least a processor 432, memory 436, and other resources as described above. Once software module 408 is running, it may have exclusive access to dedicated resources until it completes execution or a conclusion. Exemplary embodiments of at least one container 404 may include a DOCKER container (that encapsulate any payload and dependencies into a single object", RTOS container, safety-certified container (designed to meet stringent certification requirements of regulatory bodies such as, without limitation, FAA or EASA), among others.

With continued reference to FIG. 1, container 404 and/or container manager may communicate directly with a host operating system. In one or more embodiments, in instances in which contain 404 is managed by container manager 424, container manager may communicate with a host operating system 440 wherein the host operating system may transmit the communication to processor 432 and/or memory. In one or embodiments, in instances in which container 404 contains a container-runtime the container run time may communicate with the host operating system 440. In one or more embodiments, the host operating system 440 may include the operating system in which container 404 and/or container manager is running on. In one or more embodiments, host operating system 440 may include a virtual environment located atop a primary operating system and/or a virtual environment in direct communication with hardware components. In one or more embodiments, host operating system 440 may run atop a main operating system 444, wherein the main operating system 444 may include the primary operating system of the computing device and the host operating system 440 may include the virtual environment generated by a virtual machine. In instances in which host operating system may be created atop main operating system 444, a type 2 hypervisor 448 may be used to create a virtualization layer atop main operating system 444. In one or more embodiments, a host operating system 440 may communicate with type 2 hypervisor 448 wherein type 2 hypervisor 448 may communicate with main operating system 444 wherein main operating system may communicate with processor 432 and/or memory 436. In one or more embodiments, in instances in which host operating system does not run atop main operating system 444, type 1 hypervisor 452 may be configured to create a virtualization layer atop the hardware components such as processor and/or memory 436. In one or more embodiments, a virtual bus 456 may allow for communication between host operating system 440 and processor 432. In one or more embodiments, a type 1 hypervisor may allow for increased isolation wherein host operating system 440 may communicate directly with processor. In one or more embodiments, in a type 23 hypervisor, host operating system 440 must first communicate with virtualized components of type 2 hypervisor 448 wherein type 2 hypervisor may communicate with main operating system 44 and finally main operating system 444 may communicate with processor 436.

Figure 5:
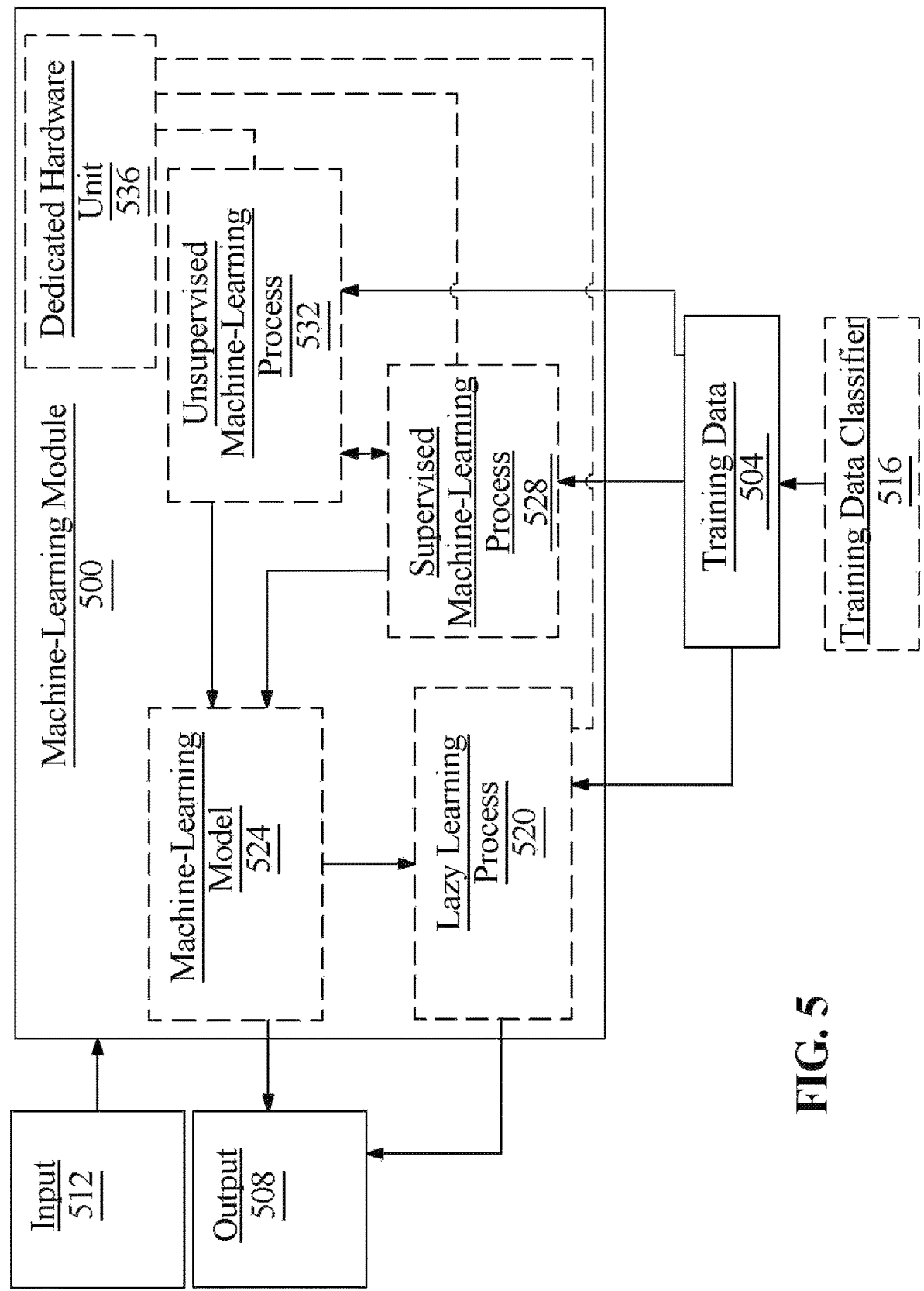
FIG. 5 is a block diagram of exemplary embodiment of a machine learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include inputs generated by software module and outputs may include outputs of software module. In one or more embodiments, machine learning module 500 may be self-contained wherein software container may be portable. In one or more embodiment, training data and machine learning module 500 may be self-contained within software container as described in reference to FIG. 1. In one or more embodiments, training data within software container may be iteratively trained and saved within software container for future iterations. In one or more embodiments, a self-contained machine learning model may allow decreased vulnerability.

In one or more embodiments, training data and/or machine learning models contained within a database may be compromised and create incorrect outputs.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to subclasses within software module.

Still referring to FIG. 5, computing device 504 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 504 may then calculate a likelihood table by calculating probabilities of different data entries and classification labels. Computing device 504 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device 504 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or another device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 525. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 525 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 525 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs of software module as described above as inputs, outputs of software module as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 525 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
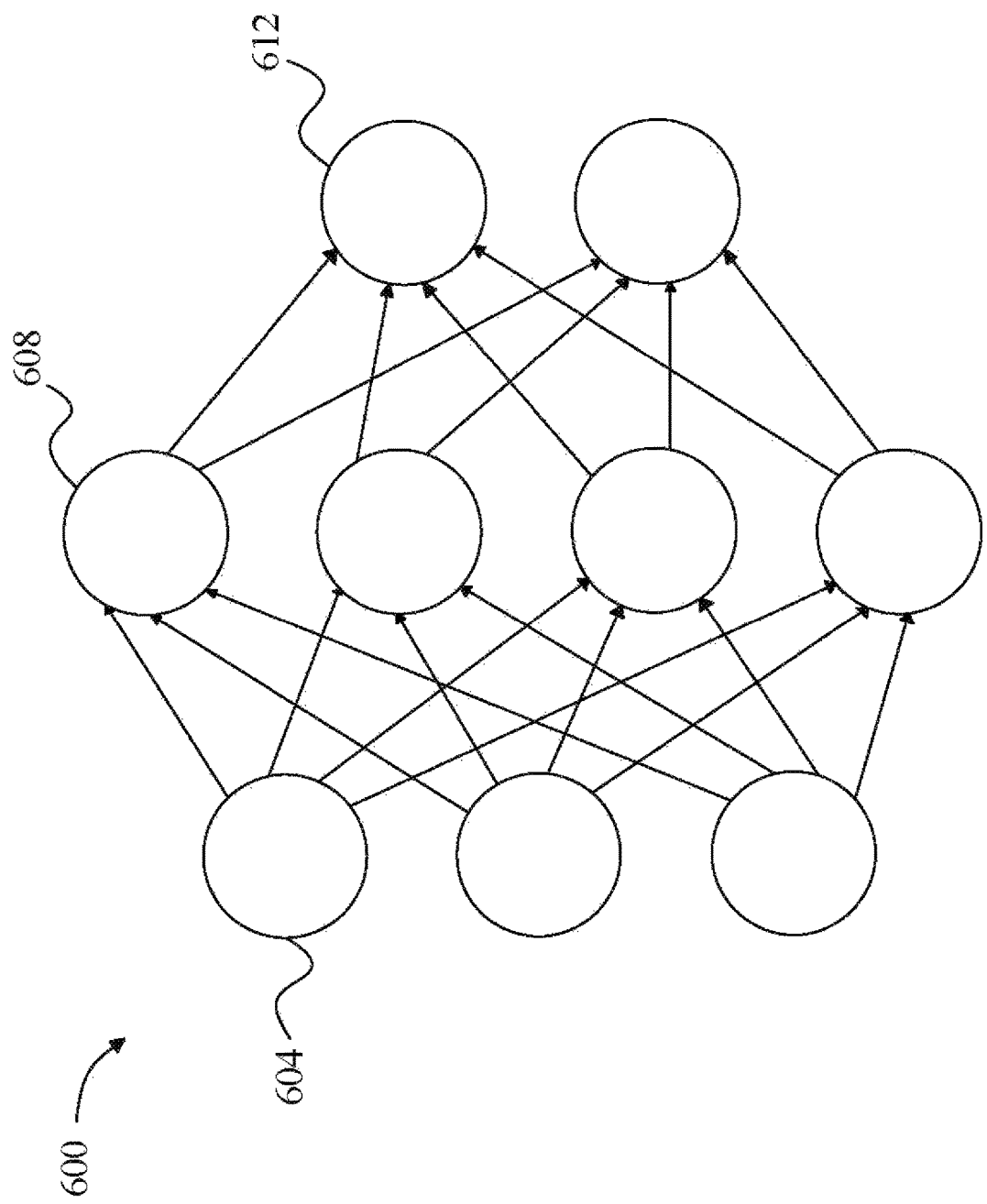
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
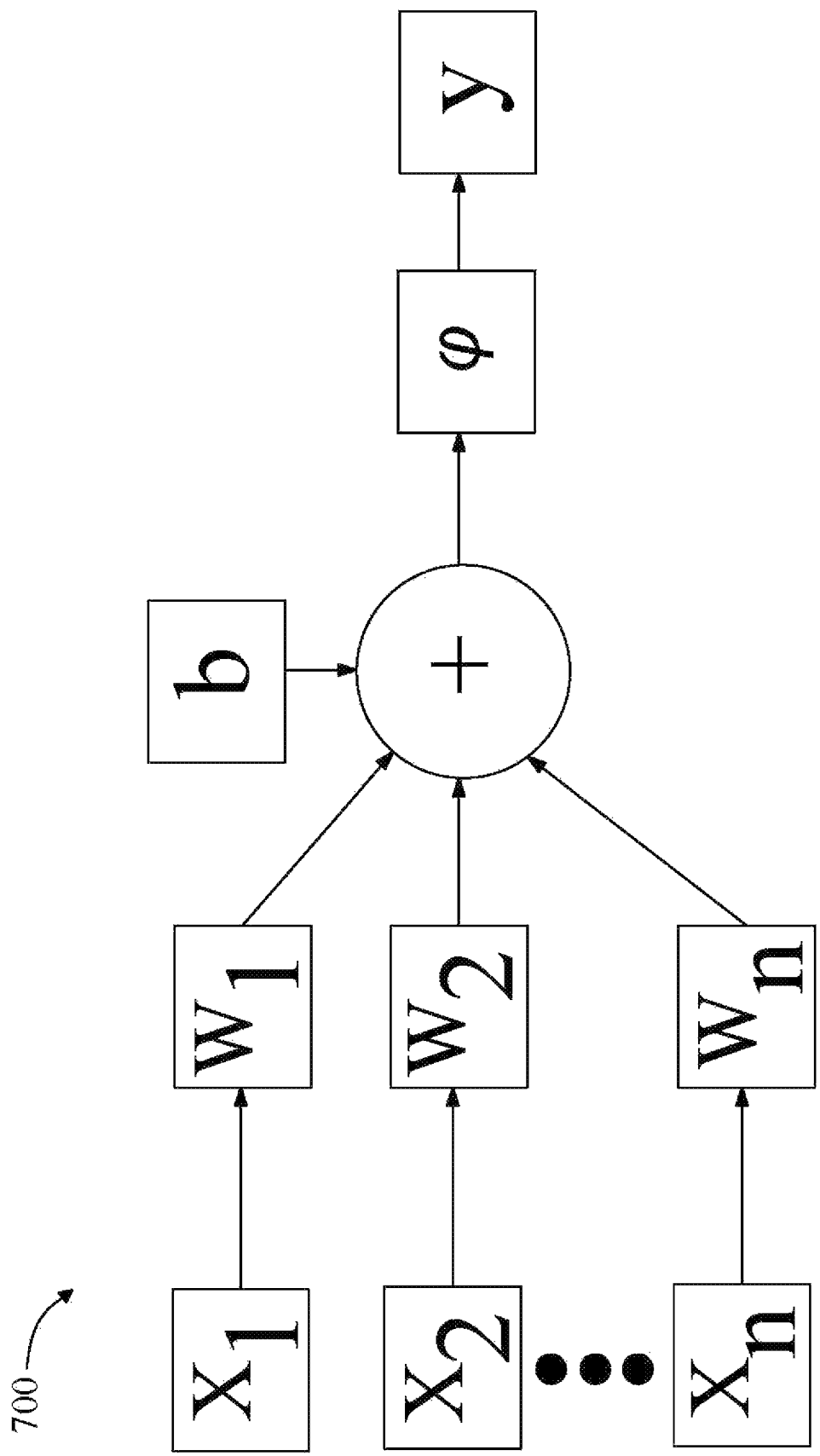
FIG. 7 is a block diagram of an exemplary embodiment of a node of a neural network.

Referring now to FIG. 7, an exemplary embodiment of a node 700 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x) = \tan h^2(x)$, a rectified linear unit function such as $f(x) = \max(0,x)$, a "leaky" and/or "parametric" rectified linear unit function such as $f(x) = \max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid (x), a Gaussian error linear unit function such as f(x)=a(1+tan h ($\sqrt{2/\pi}$(x+bx$^r$))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
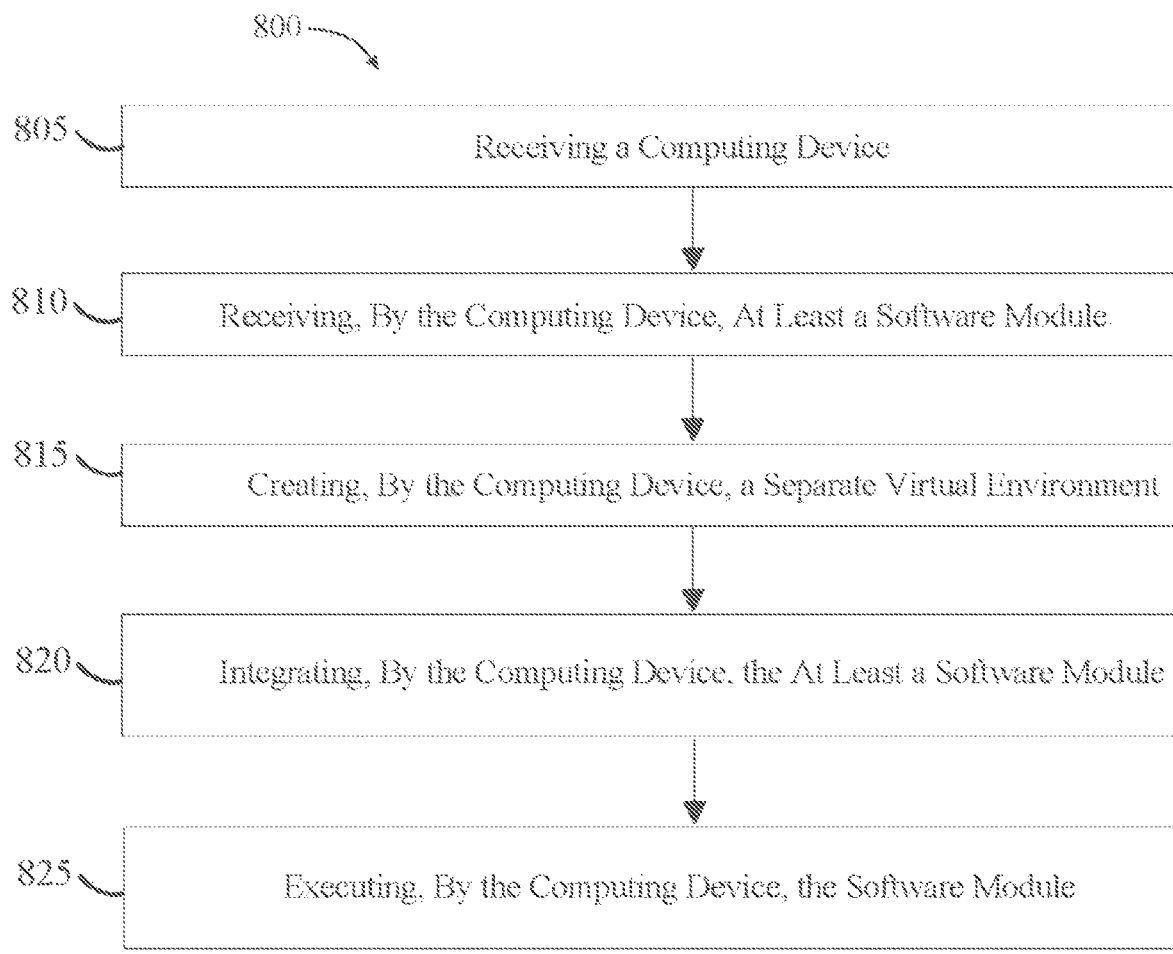
FIG. 8 is a flow diagram illustrating an exemplary embodiment of a method for providing a safety critical operating environment container architecture.
Figure 9:
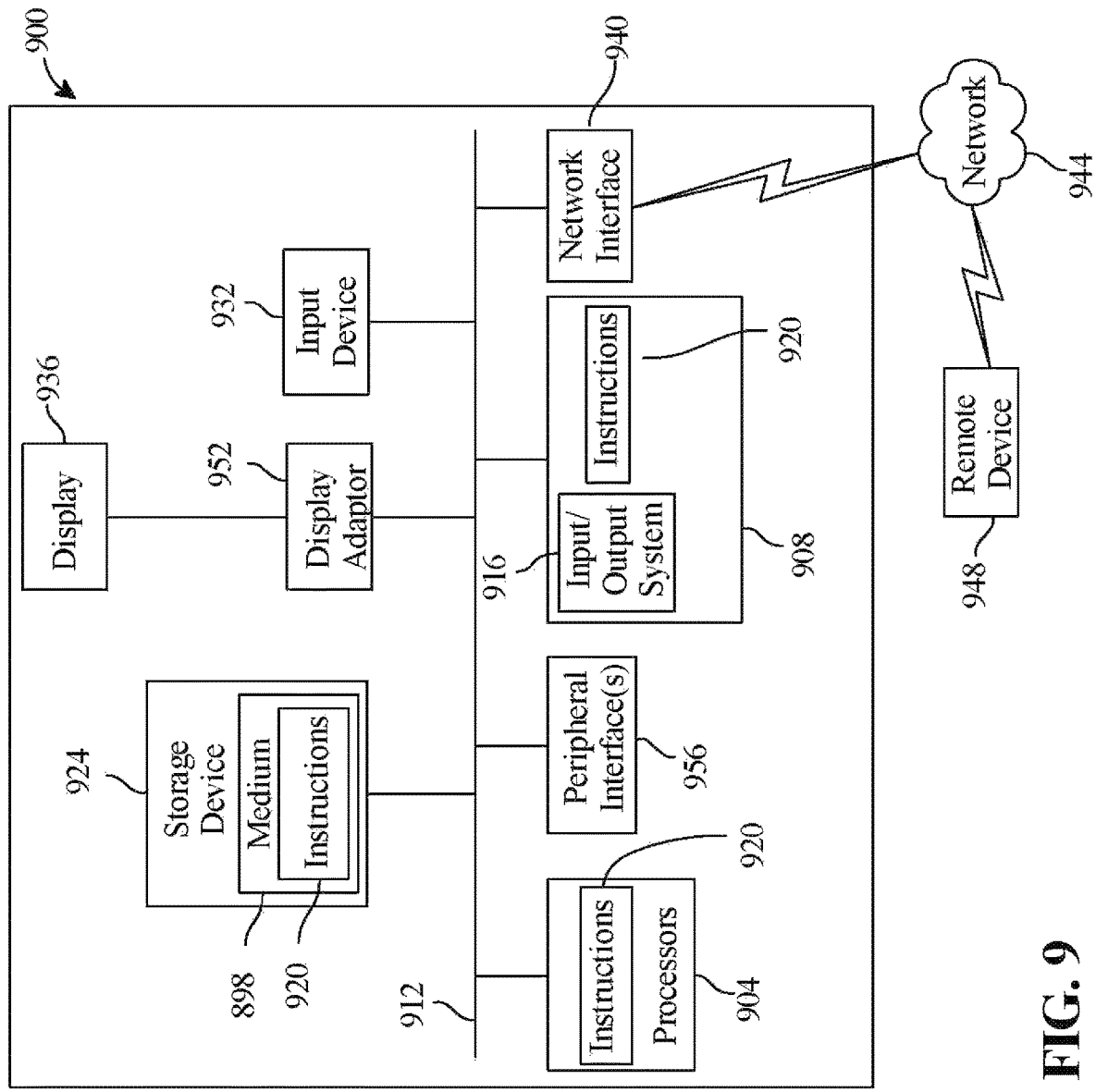
FIG. 9 is a block diagram of a computing system that can be used to implement any one or more of the methodologies disclosed herein and any one or more portions thereof.

Referring now to FIG. 8, method 800 for providing a safety critical operating environment architecture structure is described. At step 805, method 800 includes receiving a computing device. In one or more embodiments, the computing device include at least one multi-core processor and a memory communicatively connected to the at least one multi-core processor. This may be implemented with reference to FIGS. 1-8 and without limitation.

With continued reference to FIG. 8, at step 810, method 800 includes receiving, by the computing device, at least a software module to be executed on the at least one multi-core processor. This may be implemented with reference to FIGS. 1-8 and without limitation.

With continued reference to FIG. 8, at step 815, method 800 includes creating, by the computing device, a separate virtual environment for the at least a software module, wherein creating the virtual environment further includes generating a virtualization layer and allocating a dedicated private static memory space through the virtualization layer, wherein the separate virtual environment comprises a dedicated operating system. In one or more embodiments, creating the virtualization layer includes creating the virtualization lawyer using a hypervisor. In one or more embodiments, the hypervisor includes a bare metal hypervisor. In one or more embodiments, the hypervisor includes single root input/output virtualization (SR-IOV) and wherein the SR-IOV is configured to provide the one or more separate virtual environments with direct access to one or more physical hardware components of the computing device. In one or more embodiments allocating a dedicated private static memory space through the virtualization layer includes allocating a dedicated private static memory space as a function of a configuration request. In one or more embodiments, each virtual environment is connected to one or more physical devices of the computing device through a virtual binary unit method (BUS) adapter. In one or more embodiments, creating, by the computing device, the separate virtual environment for each of the one or more software containers includes assigning at least one dedicated processor core of the at least one multi-core processor to each separate virtual environment. This may be implemented with reference to FIGS. 1-8 and without limitation.

With continued reference to FIG. 8, at step 820, method 800 includes integrating the at least a software module into the virtual environment by instantiating, the software module into at least one software container, wherein the at least one software container includes a plurality of dedicated software packages. In one or more embodiments, one or more software containers are associated with a design assurance level (DAL) classification. In one or more embodiments, at least one of the plurality of dedicated software packages includes a machine learning model, wherein the machine learning model is configured to operate independently of a data source connection. This may be implemented with reference to FIGS. 1-8 and without limitation.

With continued reference to FIG. 8, at step 825, method 800 includes executing, by the computing device, the software module on each software container for each virtual environment. In one or more embodiments, method 800 further includes displaying, by the computing device, each separate virtual environment on a single display screen. In one or more embodiments, method 800 further includes generating, by the computing device, a virtual package as a function of the virtual environment and the software container. This may be implemented with reference to FIGS. 1-8 and without limitation.

one or more software containers associated with a design assurance level (DAL) classification, wherein each of the one or more software containers includes software data, a software module and a plurality of dedicated software packages configured to facilitate execution of the software module. In one or more embodiments, at least one of the plurality of dedicated software packages includes a machine learning model, wherein the machine learning model is configured to operate independently of a data source connection. This may be implemented with reference to FIGS. 1-8 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for providing a safety critical operating environment container architecture, the system comprising:
    a computing device, the computing device comprising:
        at least one multi-core processor; and
        a memory communicatively connected to the at least one multi-core processor, the memory containing instructions to configure the at least one multi-core processor to:
            receive at least a software module to be executed on the at least one multi-core processor;
            create a separate virtual environment for the at least a software module, wherein creating the separate virtual environment further comprises:
                generating a virtualization layer; and
                allocating a dedicated private static memory space through the virtualization layer, wherein allocating the dedicated private static memory space includes comparing the allocated dedicated private static memory space to an upper limit and lower limit comprising a maximum capacity that is allocated to a partition and wherein the separate virtual environment comprises a dedicated operating system;
            implement a hypervisor, wherein the hypervisor is configured to generate a virtual machine on a host operating system, and wherein the virtual machine hosts a separate and isolated software operating environment;
            integrate the at least a software module into the virtual environment by instantiating the software module into at least one software container, wherein the at least one software container comprises a plurality of dedicated software packages, wherein at least one of the plurality of dedicated software packages comprises a software defined intelligent networking (SDIN) system configured to manage network resources for various software containers by employing machine learning to predict network demands and optimize a performance of a network; and
            execute the software module on the at least one software container for the separate virtual environment.

2. The system of claim 1, wherein the hypervisor comprises a bare metal hypervisor.

3. The system of claim 1, wherein the hypervisor is configured to execute single root input/output virtualization (SR-IOV) and wherein the SR-IOV is configured to provide the separate virtual environment with direct access to one or more physical hardware components of the computing device.

4. The system of claim 1, wherein:
    allocating a dedicated private static memory space through the virtualization layer comprises allocating a dedicate private static memory space as a function of a configuration request.

5. The system of claim 1, the memory further containing instructions to configure the multi-core processor to display the separate virtual environment on a single display screen.

6. The system of claim 1, wherein at least one of the plurality of dedicated software packages comprises a machine learning model, wherein the machine learning model is configured to operate independently of a data source connection.

7. The system of claim 1, wherein the separate virtual environment is connected to one or more physical devices of the computing device through a virtual binary unit system (BUS) adapter.

8. The system of claim 1, further comprising generating a virtual package as a function of the separate virtual environment and the at least one software container.

9. The system of claim 1, wherein creating the separate virtual environment for the at least one software container comprises assigning at least one dedicated processor core of the at least one multi-core processor to the separate virtual environment.

10. A method for providing a safety critical operating environment container architecture, the method comprising:
   receiving a computing device, the computing device comprising:
      at least one multi-core processor; and
      a memory communicatively connected to the at least one multi-core processor;
   receiving, by the computing device, at least a software module to be executed on the at least one multi-core processor;
   creating, by the computing device, a separate virtual environment for the at least a software module, wherein creating the separate virtual environment further comprises:
      generating a virtualization layer; and
      allocating a dedicated private static memory space through the virtualization layer, wherein allocating the dedicated private static memory space includes comparing the allocated dedicated private static memory space to an upper limit and lower limit comprising a maximum capacity that is allocated to a partition and wherein the separate virtual environment comprises a dedicated operating system;
   implementing a hypervisor, wherein the hypervisor is configured to generate a virtual machine on a host operating system, and wherein the virtual machine hosts a separate and isolated software operating environment;
   integrating, by the computing device, the at least a software module into the virtual environment by instantiating the software module into at least one software container, wherein the at least one software container comprises a plurality of dedicated software packages, wherein at least one of the plurality of dedicated software packages comprises a software defined intelligent networking (SDIN) system configured to manage network resources for various software containers by employing machine learning to predict network demands and optimize a performance of a network; and
   executing, by the computing device, the software module on each software container for each virtual environment.

11. The method of claim 10, wherein the hypervisor comprises a bare metal hypervisor.

12. The method of claim 10, wherein the hypervisor comprises single root input/output virtualization (SR-IOV) and wherein the SR-IOV is configured to provide the separate virtual environment with direct access to one or more physical hardware components of the computing device.

13. The method of claim 10, wherein:
   allocating a dedicated private static memory space through the virtualization layer comprises allocating a dedicate private static memory space as a function of a configuration request.

14. The method of claim 10, further comprising displaying, by the computing device, the separate virtual environment on a single display screen.

15. The method of claim 10, wherein at least one of the plurality of dedicated software packages comprises a machine learning model, wherein the machine learning model is configured to operate independently of a data source connection.

16. The method of claim 10, wherein the separate virtual environment is connected to one or more physical devices of the computing device through a virtual binary unit method (BUS) adapter.

17. The method of claim 10, further comprising generating, by the computing device, a virtual package as a function of the separate virtual environment and the at least one software container.

18. The method of claim 10, wherein creating, by the computing device, the separate virtual environment for the at least one software container comprises assigning at least one dedicated processor core of the at least one multi-core processor to the separate virtual environment.

* * * * *